(12) United States Patent
Fateh et al.

(10) Patent No.: US 9,589,000 B2
(45) Date of Patent: Mar. 7, 2017

(54) METHOD AND APPARATUS FOR CONTENT ASSOCIATION AND HISTORY TRACKING IN VIRTUAL AND AUGMENTED REALITY

(71) Applicant: Atheer, Inc., Mountain View, CA (US)

(72) Inventors: Sina Fateh, Mountain View, CA (US); Ron Butterworth, Sunnyvale, CA (US); Mohamed Nabil Hajj Chehade, Los Angeles, CA (US); Allen Yang Yang, Richmond, CA (US); Sleiman Itani, East Palo Alto, CA (US)

(73) Assignee: ATHEER, INC., Mountain View, CA (US)

( * ) Notice: Subject to any disclaimer, the term of this patent is extended or adjusted under 35 U.S.C. 154(b) by 0 days.

(21) Appl. No.: 14/014,296

(22) Filed: Aug. 29, 2013

(65) Prior Publication Data
US 2014/0067768 A1    Mar. 6, 2014

Related U.S. Application Data

(60) Provisional application No. 61/695,268, filed on Aug. 30, 2012.

(51) Int. Cl.
*G09G 5/00* (2006.01)
*G06F 17/30* (2006.01)
*G06T 19/00* (2011.01)

(52) U.S. Cl.
CPC .. *G06F 17/30312* (2013.01); *G06F 17/30309* (2013.01); *G06T 19/006* (2013.01)

(58) Field of Classification Search
CPC ............. G06F 11/1471; G06F 11/2046; G06F 11/2028; G06F 17/30312; G06F 11/203; G06F 11/1438; G06F 9/44; G06T 19/006; G06T 15/20
See application file for complete search history.

(56) References Cited

U.S. PATENT DOCUMENTS

| | | | | |
|---|---|---|---|---|
| 5,952,993 | A  * | 9/1999 | Matsuda et al. | 345/474 |
| 6,223,214 | B1 * | 4/2001 | Tufty | G06Q 10/00 |
| | | | | 709/208 |
| 6,289,299 | B1 * | 9/2001 | Daniel et al. | 703/21 |
| 6,609,147 | B1 * | 8/2003 | Matsuda | A63F 13/12 |
| | | | | 709/205 |
| 6,611,253 | B1 * | 8/2003 | Cohen | 345/168 |

(Continued)

OTHER PUBLICATIONS

Co-pending U.S. Appl. No. 14/014,235 by Fateh, S., et al., filed Aug. 29, 2013.

(Continued)

*Primary Examiner* — Devona Faulk
*Assistant Examiner* — Charles L Beard
(74) *Attorney, Agent, or Firm* — Perkins Coie LLP

(57) ABSTRACT

A machine-implemented method includes establishing a virtual or augmented reality entity, and establishing a state for the entity having a state time and state properties including a state spatial arrangement. The data entity and state are stored, and are subsequently received and outputted at a time other than the state time so as to exhibit a "virtual history machine" functionality. An apparatus includes a processor, a data store, and an output. A data entity establisher, a state establisher, a storer, a data entity receiver, a state receiver, and an outputter are instantiated on the processor.

33 Claims, 17 Drawing Sheets

(56) References Cited

U.S. PATENT DOCUMENTS

| | | | | |
|---|---|---|---|---|
| 6,910,213 | B1* | 6/2005 | Hirono et al. | 718/108 |
| 7,427,996 | B2* | 9/2008 | Yonezawa et al. | 345/629 |
| 7,561,160 | B2* | 7/2009 | Fukuya | G06T 19/00 345/474 |
| 7,613,356 | B2* | 11/2009 | Uchiyama et al. | 382/271 |
| 7,631,159 | B1* | 12/2009 | Krishnamurthy | 711/162 |
| 7,843,470 | B2* | 11/2010 | Bannai et al. | 345/633 |
| 7,965,904 | B2* | 6/2011 | Kobayashi | 382/292 |
| 8,199,166 | B2* | 6/2012 | Repin et al. | 345/633 |
| 8,514,326 | B2* | 8/2013 | Miyashita et al. | 348/374 |
| 8,605,081 | B2* | 12/2013 | Holler et al. | 345/419 |
| 8,700,678 | B1* | 4/2014 | Fan et al. | 707/803 |
| 8,730,337 | B2* | 5/2014 | Inoue | H04N 1/00244 348/211.5 |
| 8,884,988 | B1* | 11/2014 | Cho | G06T 19/006 345/633 |
| 8,939,840 | B2* | 1/2015 | Heatherly | A63H 3/28 446/268 |
| 8,953,889 | B1* | 2/2015 | Worley, III | G06F 17/30489 382/103 |
| 9,117,303 | B2* | 8/2015 | Byrne | G06T 15/503 |
| 9,420,251 | B2* | 8/2016 | Inoue | H04N 5/23216 |
| 9,454,840 | B2* | 9/2016 | Caldwell | H04N 7/157 |
| 2003/0080989 | A1* | 5/2003 | Matsuda | A63F 13/10 715/706 |
| 2004/0105573 | A1* | 6/2004 | Neumann et al. | 382/103 |
| 2004/0109009 | A1* | 6/2004 | Yonezawa et al. | 345/632 |
| 2004/0150641 | A1* | 8/2004 | Duiker | G06T 7/0065 345/426 |
| 2005/0102396 | A1* | 5/2005 | Hipp | 709/224 |
| 2006/0203012 | A1* | 9/2006 | Nakajima | G06F 17/30265 345/629 |
| 2006/0250507 | A1* | 11/2006 | Miyajima | G06F 17/30265 348/231.5 |
| 2006/0257104 | A1* | 11/2006 | Yamagata et al. | 386/95 |
| 2007/0075993 | A1* | 4/2007 | Nakanishi et al. | 345/419 |
| 2007/0083645 | A1* | 4/2007 | Roeck et al. | 709/224 |
| 2008/0126856 | A1* | 5/2008 | Levidow et al. | 714/19 |
| 2008/0155198 | A1* | 6/2008 | Factor et al. | 711/143 |
| 2008/0215970 | A1* | 9/2008 | Tsuji et al. | 715/702 |
| 2008/0235628 | A1* | 9/2008 | Faught | 715/848 |
| 2008/0256138 | A1* | 10/2008 | Sim-Tang | 707/202 |
| 2008/0281766 | A1* | 11/2008 | Kwok | 706/12 |
| 2008/0318678 | A1* | 12/2008 | Stivoric et al. | 463/36 |
| 2009/0113515 | A1* | 4/2009 | Zalewski | H04L 12/1831 726/1 |
| 2009/0113554 | A1* | 4/2009 | Zalewski | A63F 13/12 726/26 |
| 2009/0119604 | A1* | 5/2009 | Simard et al. | 715/757 |
| 2009/0164397 | A1* | 6/2009 | Kwok | 706/21 |
| 2009/0234788 | A1* | 9/2009 | Kwok | G06N 3/006 706/46 |
| 2009/0256837 | A1* | 10/2009 | Deb et al. | 345/419 |
| 2010/0045665 | A1* | 2/2010 | Lefevre | G06T 7/20 345/419 |
| 2010/0103196 | A1* | 4/2010 | Kumar et al. | 345/633 |
| 2010/0134494 | A1* | 6/2010 | Lim et al. | 345/426 |
| 2010/0180092 | A1* | 7/2010 | Rajaa et al. | 711/162 |
| 2010/0257252 | A1* | 10/2010 | Dougherty et al. | 709/217 |
| 2011/0014977 | A1* | 1/2011 | Yamazaki | A63F 13/04 463/30 |
| 2011/0055927 | A1* | 3/2011 | Hamilton, II | G06F 3/011 726/26 |
| 2011/0093418 | A1* | 4/2011 | Kwok | 706/12 |
| 2011/0197201 | A1* | 8/2011 | Yoo et al. | 719/313 |
| 2011/0216090 | A1* | 9/2011 | Woo et al. | 345/633 |
| 2011/0227812 | A1* | 9/2011 | Haddick et al. | 345/8 |
| 2011/0258175 | A1* | 10/2011 | Kim et al. | 707/709 |
| 2012/0030289 | A1* | 2/2012 | Buford | G06Q 10/10 709/205 |
| 2012/0105440 | A1* | 5/2012 | Lieberman et al. | 345/419 |
| 2012/0136793 | A1* | 5/2012 | Valin | G06Q 20/10 705/53 |
| 2012/0162733 | A1* | 6/2012 | Ferraro | G03H 1/0866 359/9 |
| 2012/0226983 | A1* | 9/2012 | Goldenberg | G06F 3/0481 715/724 |
| 2012/0229449 | A1* | 9/2012 | Psistakis et al. | 345/419 |
| 2012/0249528 | A1* | 10/2012 | Park et al. | 345/419 |
| 2012/0249544 | A1* | 10/2012 | Maciocci et al. | 345/419 |
| 2012/0272192 | A1* | 10/2012 | Grossman et al. | 715/854 |
| 2012/0300019 | A1* | 11/2012 | Yang et al. | 348/36 |
| 2013/0009993 | A1* | 1/2013 | Horseman | 345/633 |
| 2013/0040714 | A1* | 2/2013 | Rosing | 463/7 |
| 2013/0044130 | A1* | 2/2013 | Geisner et al. | 345/633 |
| 2013/0083011 | A1* | 4/2013 | Geisner | G09G 5/00 345/419 |
| 2013/0147838 | A1* | 6/2013 | Small et al. | 345/633 |
| 2013/0159430 | A1* | 6/2013 | Ranade | G06Q 10/103 709/206 |
| 2013/0211774 | A1* | 8/2013 | Bentley | A61B 5/11 702/145 |
| 2013/0225309 | A1* | 8/2013 | Bentley | G06K 9/00342 473/266 |
| 2013/0251333 | A1* | 9/2013 | Berbecel | H04N 5/783 386/230 |
| 2013/0342813 | A1* | 12/2013 | Wang | G02B 5/124 353/7 |
| 2014/0067768 | A1* | 3/2014 | Fateh | G06F 9/44 707/684 |
| 2014/0250411 | A1* | 9/2014 | Gilra | G06F 3/04842 715/811 |
| 2014/0289323 | A1* | 9/2014 | Kutaragi | G06Q 50/01 709/203 |
| 2014/0378194 | A1* | 12/2014 | Bentley | A63F 13/573 463/3 |
| 2015/0039577 | A1* | 2/2015 | Talagala et al. | 707/703 |
| 2015/0154452 | A1* | 6/2015 | Bentley | G06K 9/00711 386/201 |
| 2015/0178362 | A1* | 6/2015 | Wheeler | G06F 9/44505 707/639 |
| 2015/0317801 | A1* | 11/2015 | Bentley | H04N 7/181 382/107 |
| 2015/0318015 | A1* | 11/2015 | Bose | H04N 7/188 386/248 |
| 2015/0324636 | A1* | 11/2015 | Bentley | G11B 27/17 386/227 |
| 2015/0348591 | A1* | 12/2015 | Kaps | G11B 27/17 386/201 |
| 2016/0086379 | A1* | 3/2016 | Sadi | G06T 19/006 345/633 |
| 2016/0112501 | A1* | 4/2016 | Wheeler | H04L 67/104 709/204 |

OTHER PUBLICATIONS

Non-Final Office Action mailed Nov. 8, 2013, for Co-pending U.S. Appl. No. 14/014,285 by Fateh, S., et al., filed Aug. 29, 2013.

\* cited by examiner

METHOD AND APPARATUS FOR CONTENT ASSOCIATION AND HISTORY TRACKING IN VIRTUAL AND AUGMENTED REALITY

CLAIM OF PRIORITY

This application claims the benefit of U.S. Provisional Application Ser. No. 61/695,268 filed on Aug. 30, 2012, the contents of which are incorporated by reference for all intents and purposes.

FIELD OF THE INVENTION

This invention relates to association of content in virtual and/or augmented reality environments. More particularly, the invention relates to establishing historical states for virtual and/or augmented reality entities, so as to enable at least partial reconstruction of entities and/or environments as at earlier times.

DESCRIPTION OF RELATED ART

In some virtual and/or augmented reality environments, entities may be disposed therein that a user of such environments may view, manipulate, modify, etc. Depending on the particulars of a given environment, users may be able to move or rotate virtual/augmented objects, cause such objects to appear and disappear, change color, etc.

However, facilitating such malleability in a virtual or augmented reality has drawbacks. Namely, in altering a virtual or augmented reality entity, a user is in some sense destroying or overwriting the original entity. The original state of the entity, and/or intermediate states of the entity, may be lost. While this can pose difficulties for even a simple environment supporting a single user, it may become increasingly problematic as the size, complexity, and number of entities increases, and as the number of potential users increases. In particular, for a large shared environment with many users, it is possible for even a single such user (whether by accident or malice) to irreparably alter or destroy entities important to the environment and/or the experience that environment provides.

There is a need for a method and apparatus to support association of content for virtual and/or augmented reality environments in such a way as to oppose undesirable loss of such content, without unduly limiting the ability of users to manipulate content.

BRIEF SUMMARY OF THE INVENTION

The present invention contemplates a variety of systems, apparatus, methods, and paradigms for associating virtual and/or augmented reality content.

In one embodiment of the present invention, a machine-implemented method is provided. The method includes establishing a data entity, the data entity being an augmented reality entity and/or a virtual reality entity. The method also includes establishing a state for the data entity, said state including a state time and state properties that at least substantially correspond to properties of the data entity substantially at the time of establishment of the state, at least one of the plurality of state properties being a state spatial arrangement of said entity. The method further includes storing the data entity and the state so as to enable output of the data entity to an augmented reality environment and/or a virtual reality environment, with the data entity exhibiting at least one state property as at the state time, the output of the data entity being at an output time substantially different from the state time.

Establishing data entity may include selecting the data entity, the data entity being in existence prior to the selection thereof. Establishing the data entity may include creating the data entity. Establishing the data entity may include generating the data entity from a parent entity. The parent entity may be a physical object, a physical background, a physical environment, a physical creature, and/or a physical phenomenon. The parent entity may be an augmented reality object and/or a virtual reality object.

At least a portion of the state may be incorporated within the data entity. At least a portion of the state may be distinct from the data entity.

The state properties may include the identity of the data entity.

The state spatial arrangement may include an absolute position of the data entity and/or an absolute orientation of the data entity. The state spatial arrangement may include a relative position of the data entity and/or a relative orientation of the data entity.

The state properties may include a still image, a video, audio, olfactory data, a 2D model, a 3D model, text, numerical data, an environmental condition, animation, resolution, frame rate, bit depth, sampling rate, color, color distribution, spectral signature, brightness, brightness distribution, reflectivity, transmissivity, absorptivity, surface texture, geometry, mobility, motion, speed, direction, acceleration, temperature, temperature distribution, composition, chemical concentration, electrical potential, electrical current, mass, mass distribution, density, density distribution, price, quantity, nutritional information, user review, presence, visibility, RFID data, barcode data, a file, executable instructions, a hyperlink, a data connection, a communication link, contents, an association, a creator, and/or a system ID.

Establishing the data entity may include comprises distinguishing the data entity from its surroundings.

The method may include retrieving the data entity, retrieving the state, and at an output time substantially different from the state time outputting the data entity to an augmented reality environment and/or virtual reality environment, with the data entity exhibiting at least one of the state properties as at the state time.

The method may include establishing multiple data entities and establishing a state corresponding with each data entity, the state comprising a state time and state properties at least substantially corresponding to properties of the data entity substantially at the time of establishment of the state, the state properties including a state spatial arrangement of the data entity. The method may further include storing each data entity and its corresponding state so as to enable output of the entities to the augmented reality environment and/or virtual reality environment with each data entity exhibiting at least one of the corresponding state properties as at the corresponding state time, the output of the data entities being at an output time substantially different from the state times.

The method may include establishing multiple states for the data entity, each state including a state time and state properties at least substantially corresponding to properties of the data entity substantially at the time of establishment of the state, the state properties including a state spatial arrangement of the data entity. The method may further include storing the data entity and the states so as to enable output of the data entity to the augmented reality environment and/or virtual reality environment with the data entity exhibiting at least one state property for a selected state as at the state time for the selected state, the output of the data entity being at an output time substantially different from the state time for the selected state.

In another embodiment of the present invention, an apparatus is provided that includes means for establishing a data entity, the data entity comprising at least one of a group consisting of an augmented reality entity and a virtual reality entity, means for establishing a state for the data entity, the state including a state time and state properties at least substantially corresponding to properties of the data entity substantially at the time of establishment of the state, the plurality of state properties comprising a state spatial arrangement of the data entity. The apparatus also includes means for storing the data entity and the state so as to enable output of the data entity to an augmented reality environment and/or virtual reality environment with the data entity exhibiting at least one of the state properties as at the state time, the output of the data entity being at an output time substantially different from the state time.

In another embodiment of the present invention, a machine-implemented method is provided, the method including receiving a data entity, the data entity being an augmented reality entity and/or a virtual reality entity. The method includes receiving a state for the data entity, the state including a state time and state properties at least substantially corresponding to properties of the data entity substantially at the state time, the state properties including a state spatial arrangement of the data entity. The method further includes, at an output time substantially different from the state time, outputting the data entity to an augmented reality environment and/or a virtual reality environment, the data entity exhibiting at least one of the state properties as at the state time.

At least a portion of the state may be incorporated within the data entity. At least a portion of the state may be distinct from the data entity.

The state properties may include an identity of the data entity.

The state spatial arrangement may include an absolute position of the data entity and/or an absolute orientation of the data entity. The state spatial arrangement may include a relative position of the data entity and/or a relative orientation of the data entity.

The state properties may include a still image, a video, audio, olfactory data, a 2D model, a 3D model, text, numerical data, an environmental condition, animation, resolution, frame rate, bit depth, sampling rate, color, color distribution, spectral signature, brightness, brightness distribution, reflectivity, transmissivity, absorptivity, surface texture, geometry, mobility, motion, speed, direction, acceleration, temperature, temperature distribution, composition, chemical concentration, electrical potential, electrical current, mass, mass distribution, density, density distribution, price, quantity, nutritional information, user review, presence, visibility, RFID data, barcode data, a file, executable instructions, a hyperlink, a data connection, a communication link, contents, an association, a creator, and/or a system ID.

The method may include receiving a first state for the data entity, the first state including a first state time and first state properties at least substantially corresponding to properties of the data entity substantially at the first state time, the first state properties including a first state spatial arrangement of the data entity, and receiving a second state for the data entity, the second state including a second state time and second state properties at least substantially corresponding to properties of the data entity substantially at the second state time, the second state properties including a second state spatial arrangement of the data entity. The method may further include, at the output time, outputting a first iteration of the data entity exhibiting at least one of the first state properties as at the first state time, at the output time outputting a second iteration of the data entity exhibiting at least one of the second state properties as at the second state time.

The method may include receiving a first state for the data entity, the first state including a first state time and first state properties at least substantially corresponding to properties of the data entity substantially at the first state time, the first state properties including a first state spatial arrangement of the data entity, and receiving a second state for the data entity, the second state including a second state time and second state properties at least substantially corresponding to properties of the data entity substantially at the second state time, the second state properties including a second state spatial arrangement of the data entity. The method may further including, at a first output time substantially different from the first state time, outputting a first iteration of the data entity exhibiting at least one first state property as at the first state time, and at a second output time subsequent to the first output time, outputting a second iteration of the data entity exhibiting at least one second state property as at the second state time.

The data entity may exhibits at least the state spatial arrangement as at the state time. The data entity may not exhibit the state spatial arrangement as at the state time. The data entity may exhibit all of the state properties as at the state time.

In another embodiment of the present invention, an apparatus is provided including means for receiving a data entity, the data entity being an augmented reality entity and/or a virtual reality entity, and means for receiving a state for the data entity, the state including a state time and state properties at least substantially corresponding to properties of the data entity substantially at the state time, the state properties including a state spatial arrangement of the data entity. The apparatus further includes means for, at an output time substantially different from the state time, outputting the data entity to an augmented reality environment and/or a virtual reality environment, the data entity exhibiting at least one of the state properties as at the state time.

In another embodiment of the present invention, an apparatus is provided that includes a processor adapted to execute executable instructions. A data entity establisher is instantiated on the processor, the data entity establisher including executable instructions adapted for establishing a data entity that is an augmented reality entity and/or a virtual reality entity. A state establisher is instantiated on the processor, the state establisher including executable instructions adapted for establishing a state for the data entity, the state including a state time and state properties at least substantially corresponding to properties of the data entity substantially at the state time, the state properties including a state spatial arrangement of the data entity. The apparatus includes a data store in communication with the processor. A storer also is instantiated on the processor, the storer including executable instructions adapted for storing in the data store the data entity and the state so as to enable output of the data entity to an augmented reality environment and/or a virtual reality environment with the data entity exhibiting at least one state property as at the state time, the output of the data entity being at an output time substantially different from the state time.

The apparatus may include a chronometer adapted to determine the output time. The apparatus may include at least one sensor in communication with the processor. The at least one sensor may be adapted to determine the spatial arrangement of the apparatus at the state time, the spatial arrangement of the apparatus at the output time, and/or the state spatial arrangement of the data entity.

The sensor may be an accelerometer, a gyroscope, an imager, a stereo pair of imagers, a GPS sensor, a magnetometer, a structured light sensor, a time-of-flight sensor, an ultrasonic sensor, and/or a wireless signal triangulation sensor.

The sensor be a bar code reader, a chemical sensor, an electrical sensor, an electrical field sensor, a gas detector, a humidity sensor, an imager, a stereo pair of imagers, a light sensor, a magnetic field sensor, a microphone, a motion sensor, a pressure sensor, a radar sensor, a radiation sensor, an RFID sensor, a smoke sensor, a spectrometer, a thermal sensor, an ultrasonic sensor, and/or a vibration sensor.

The apparatus may include a data entity distinguisher instantiated on the processor, the data entity distinguisher including executable instructions adapted for distinguishing the data entity from a surrounding thereof.

The apparatus may include an identifier instantiated on the processor, the data entity identifier including executable instructions adapted for identifying the data entity, a parent entity for the data entity, and/or at least one of the state properties.

Some or all of the apparatus may be disposed on a head mounted display.

The apparatus may include a data entity receiver instantiated on the processor, the data entity receiver including executable instructions adapted for receiving the data entity from the data store. The apparatus also may include a state receiver instantiated on the processor, the state receiver including executable instructions adapted for receiving from the data store the state for the data entity. The apparatus may further include an output in communication with the processor, the output being adapted to output the data entity. The output also may include an outputter instantiated on the processor, the outputter including executable instructions adapted for outputting the data entity an augmented reality environment and/or a virtual reality environment at an output time substantially different from the state time, with the data entity exhibiting at least one of the state properties as at the state time.

In another embodiment of the present invention, an apparatus is provided that includes a processor adapted to execute executable instructions and a data store in communication with the processor. A data entity receiver is instantiated on the processor, the data entity receiver including executable instructions adapted for receiving from the data store a data entity, the data entity including an augmented reality entity and/or a virtual reality entity. A state receiver is instantiated on the processor, the state receiver including executable instructions adapted for receiving from the data store a state for the data entity, the state including a state time and state properties at least substantially corresponding to properties of the data entity substantially at the state time, the state properties including a state spatial arrangement of the data entity. The apparatus includes an output in communication with the processor, the output being adapted to output the data entity. An outputter is instantiated on the processor, the outputter including executable instructions adapted for outputting the data entity to an augmented reality environment and/or a virtual reality environment at an output time substantially different from the state time, with the data entity exhibiting at least one of the state properties as at the state time.

The apparatus may include a chronometer adapted to determine the output time.

The apparatus may include at least one sensor in communication with the processor. The sensor may be adapted to determine the spatial arrangement of the apparatus at the state time, the spatial arrangement of the apparatus at the output time, and/or the state spatial arrangement of the data entity. The sensor may be an accelerometer, a gyroscope, an imager, a stereo pair of imagers, a GPS sensor, a magnetometer, a structured light sensor, a time-of-flight sensor, an ultrasonic sensor, and/or a wireless signal triangulation sensor.

The output may be a visual display. The output may be a stereo pair of visual displays.

Some or all of the apparatus may be disposed on a head mounted display.

In another embodiment of the present invention, a method is provided that includes instantiating on a processor a data entity establisher, the data entity establisher including executable instructions adapted for establishing a data entity that is an augmented reality entity and/or a virtual reality entity. The method includes instantiating on the processor a state establisher, the state establisher including executable instructions adapted for establishing a state for the data entity, the state including a state time and a state properties at least substantially corresponding to properties of the data entity substantially at the state time, the state properties including a state spatial arrangement of the data entity. The method also includes instantiating on the processor a storer, the storer including executable instructions adapted for storing the data entity and the state so as to enable output of the data entity to an augmented reality environment and/or a virtual reality environment with the data entity exhibiting at least one of the state properties as at the state time, the output of the data entity being at an output time substantially different from the state time.

The data entity establisher may be adapted to select the data entity, the data entity being in existence prior to a selection thereof. The data entity establisher may be adapted to create the data entity. The data entity establisher may be adapted to generate the data entity from a parent entity. The parent entity may be a physical object, a physical background, a physical environment, a physical creature, and/or a physical phenomenon. The parent entity may be an augmented reality object and/or a virtual reality object.

The method may include instantiating on the processor a data entity distinguisher, the data entity distinguisher including executable instructions adapted for distinguishing the data entity from a surrounding thereof.

The method may include instantiating on the processor an identifier, the identifier including executable instructions adapted for identifying the data entity, a parent entity for the data entity, and/or at least one of the state properties.

The method may include instantiating on the processor a data entity receiver, the data entity receiver including executable instructions adapted for receiving the data entity from the data store. The method may include instantiating on the processor a state receiver, the state receiver including executable instructions adapted for receiving the state from the data store. The method may also include instantiating on the processor an outputter, the outputter including executable instructions adapted for outputting the data entity to an augmented reality environment and/or a virtual reality environment at the output time, with the data entity exhibiting at least one of the plurality of state properties as at the state time.

In another embodiment of the present invention a method is provided that includes instantiating on a processor a data entity receiver, the data entity receiver including executable instructions adapted for receiving a data entity from a data store, the data entity including an augmented reality entity and/or a virtual reality entity. The method includes instantiating on the processor a state receiver, the state receiver including executable instructions adapted for receiving from the data store a state for the data entity, the state including a state time and state properties at least substantially corresponding to properties of the data entity substantially at the state time, the state properties including a state spatial arrangement of the data entity. The method also includes instantiating on the processor an outputter, the outputter including executable instructions adapted for outputting the data entity to an augmented reality environment and/or a virtual reality environment at an output time substantially different from the state time, with the data entity exhibiting at least one of the state properties as at the state time.

The state receiver may be adapted to receive from the data store a first state for the data entity, the first state including a first state time and first state properties at least substantially corresponding to properties of the data entity substantially at the first state time, the first state properties including a first state spatial arrangement of the data entity. The state receiver may also be adapted to receive from the data store a second state for the data entity, the second state including a second state time and second state properties at least substantially corresponding to properties of the data entity substantially at the second state time, the second state properties including a second state spatial arrangement of the data entity. The outputter may be adapted to output at the output time a first iteration of the data entity exhibiting at least one of the first state properties as at the first state time, and the outputter may be adapted to output at the output time a second iteration of the data entity exhibiting at least one of the second state properties as at the second state time.

The state receiver may be adapted to receive from the data store a first state for the data entity, the first state including a first state time and a first state properties at least substantially corresponding to properties of the data entity substantially at the first state time, the first state properties including a first state spatial arrangement of the data entity. The state receiver also may be adapted to receive from the data store a second state for the data entity, the second state including a second state time and second state properties at least substantially corresponding to properties of the data entity substantially at the second state time, the second state properties including a second state spatial arrangement of the data entity. The outputter may be adapted to output at a first output time substantially different from the first state time a first iteration of the data entity exhibiting at least one of the first state properties as at the first state time. The outputter also may be adapted to output at a second output time subsequent to the first output time a second iteration of the data entity exhibiting at least one of second state properties as at the second state time.

BRIEF DESCRIPTION OF THE SEVERAL VIEWS OF THE DRAWINGS

Like reference numbers generally indicate corresponding elements in the figures.

DETAILED DESCRIPTION OF THE INVENTION

Figure 1:
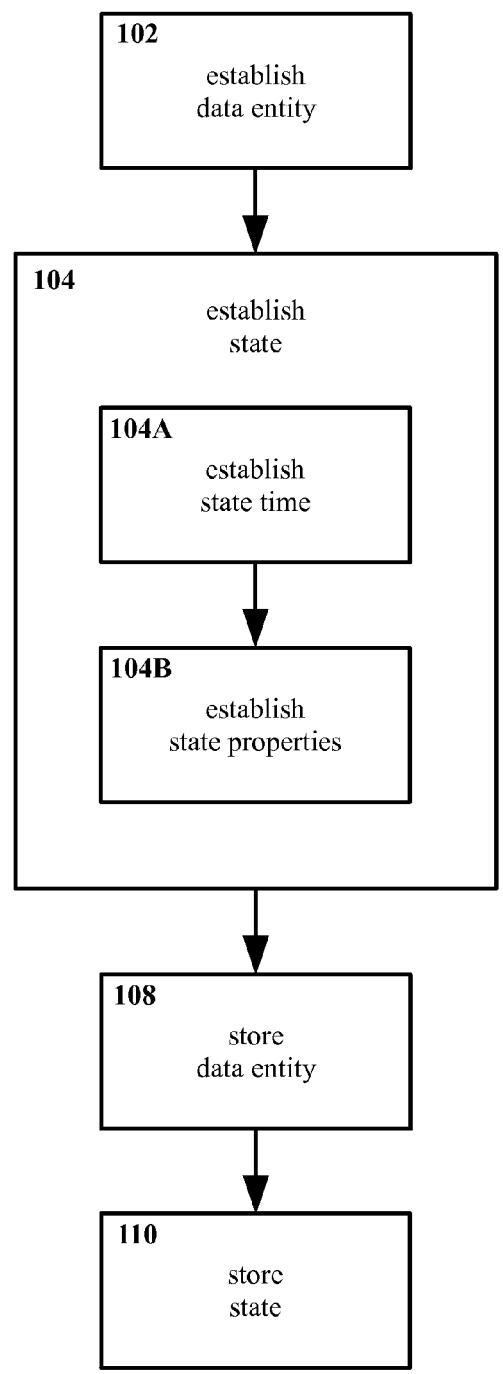
FIG. 1 shows an example method for associating content for an entity according to the present invention.

Referring to FIG. 1, an example machine-controlled method for associating content for an entity according to the present invention is shown therein.

In the method shown in FIG. 1, a data entity is established 102 in a processor. Some explanation of "data entity" and "established" with regard to the present invention may illuminating prior to further description of the example method.

With regard to the present invention, the term "data entity" encompasses information constructs that represent one or more objects, elements, phenomena, locales, environments, etc. Alternately, wherein an object, phenomenon, etc. that is to be represented is itself an information construct, e.g. a digital image or 3D model, the data entity may itself be either the original information construct or a copy thereof. However, it is emphasized that even in such cases, it is not required that a data entity be an exact or even an approximate copy of an original information construct.

A data entity may be a virtual reality entity and/or may be an augmented reality entity. For example, a virtual avatar, an augmented marking identifying a real-world bus stop, a review of a restaurant attached to the sidewalk in front of the restaurant as an augmentation, etc. may all be treated as data entities for purposes of the present invention.

However, the concept of a data entity for purposes of the present invention is not limited only to representing well-defined or individual objects. For example, a data construct representing the collective image, appearance, 3D model, etc. of a background at some location may be considered a data entity for at least certain embodiments of the present invention; although such a background may not be, in a strict sense, an "object", nevertheless for at least certain embodiments a background can be reasonably represented as a single data entity. Likewise, other groupings and even abstractions may be considered and/or represented as data entities, e.g. "foot traffic" might be treated collectively as a data entity, for example being record of the number of persons walking through an area, the average speed of the persons, the proportion of persons walking one direction as opposed to another direction, etc. Given such an arrangement, the individual persons would not necessarily be represented with individual entities therefor (though representing individuals with individual entities is also not excluded); nevertheless an entity may be established to represent the collective phenomenon of foot traffic.

It is emphasized that although a data entity for purposes of the present invention is, as noted, an information construct, data entities may derive from parent entities that are real-world objects, elements, phenomena, locales, environments, etc. Thus, although a data entity may be data, such a data entity may represent, and may even be visually indistinguishable from, one or more actual physical features. For example, a data entity might represent a physical automobile, a portion of a physical automobile, a group of physical automobiles, etc.

The concept of establishing a data entity also is to be considered broadly with regard to the present invention. It is noted that to "establish" something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.). Similarly, establishing a data entity may encompass several potential approaches, including but not limited to the following.

Establishing a data entity may include generating the data entity from some parent entity, including but not limited to a physical object, a virtual object, an augmented object, or some other data object.

Establishing a data entity also may include creating the data entity without regard to a parent entity, e.g. a processor may execute instructions so as to create a data entity in some fashion, whether from existing data, user inputs, internal algorithms, etc.

Establishing a data entity additionally may include selecting a previously-existing data entity, for example by reading a data entity from a data store, downloading a data entity from a communication link, or otherwise obtaining a data entity that already exists substantially in a form as to be used by some embodiment of the present invention.

The present invention is not particularly limited insofar as how a data entity may be established. It is required only that a data entity that is functional in terms of the present invention is in some fashion made manifest. Other arrangements than those described may be equally suitable. Also, where used with regard to other steps such as establishing a state, establishing a state time, establishing a state property, etc., establishing should be similarly be interpreted in a broad fashion.

Returning to the method of FIG. 1, a state is established 104 for the data entity. For illustrative purposes, establishing a state 104 for the data entity may be considered as two sub-steps, as described below. However, it is emphasized with regard to establishing a state 104 that in at least some embodiments the sub-steps may be executed together, simultaneously, in parallel, etc., and are not necessarily required to be executed as distinct steps.

In addition, it is noted that although for certain embodiments it may be useful to establish a state for a data entity immediately upon establishing the data entity itself, e.g. as a "baseline" state for that data entity, this is not required. Establishment of a data entity and establishment of a state therefor are distinct events, and may be executed at different times, in different places, using different processors, by different users, etc. Indeed, in general individual steps of the example methods as shown and described should not be considered to necessarily be limited to sequential execution, simultaneous execution, etc. unless so specified herein or so mandated by logic.

Returning to FIG. 1, in establishing a state 104, a state time is established 104A, and state properties also are established 104B for the data entity, the state properties at least substantially corresponding to properties of the data entity as of the state time.

A state time is a time reference for when the state is established. That is, a state that is established at 3:02 PM on Jul. 19, 2014 would have that time as a state time. It is preferable that a state time be sufficiently precise and/or accurate as to uniquely identify a particular state for a particular data entity. However, no specific limits regarding precision, accuracy, format, etc. are imposed, and such factors may vary from one embodiment to another.

A state property is some feature of the data entity itself or that is or may be associated with the data entity, and/or that provides some degree of information regarding the data entity, the association of the data entity with other entities, other data, etc., or that otherwise describes the data entity. State properties may vary greatly from one embodiment to another, from one data entity to another, and from one state to another, and the present invention is not particularly limited with regard thereto.

It is noted that state properties are not necessarily required to be exact representations of the properties of the data entity. State properties represent the properties of the data entity at the state time, such that the state properties are substantially similar to corresponding properties of the data entity. For example, a state property representing the color of the data entity should at least substantially correspond to the actual color of the data entity, but perfect representation is not required. However, although not required, it is permissible for state properties to be exact representations of corresponding properties of the data entity at the state time (for example if the color of the data entity is itself defined by a color code, copying the color code as digital data might constitute establishing an exact representation of the color).

State properties for a particular state are associated with the state time for that particular state. Thus, a state property may be considered to be some feature of the data entity as the data entity exists at the associated state time.

As noted state properties may vary considerably. However, typically though not necessarily, each state will include as one of the state properties thereof a spatial arrangement property for the data entity.

The particulars of spatial arrangement properties may vary, and in particular will vary based on the nature of the data entity for which the state in question is established. For example, for a data entity that represents an augmented reality entity that is applied to a location in the physical world, the spatial arrangement property for a state might include the position of the entity with respect to the physical world, and/or the orientation of the entity with respect to the physical world. Similarly, for a data entity that represents a physical object within the physical world, the spatial arrangement property for a state also might include position and/or orientation in some global and/or absolute coordinate system, e.g. latitude and longitude, etc.

However, spatial arrangement properties also may be determined relatively, compared to some point or points. For example, a spatial arrangement property might include heading and distance from some person, from some object or terrain feature, from some reference mark, etc., with or without absolute coordinates. Likewise, a spatial arrangement property may include orientation of an entity in relative terms, e.g. a vehicle facing toward a person or landmark, with or without absolute orientation information.

In addition, spatial arrangement properties may include factors such as speed of motion (if any)—that is, a rate of change in position—direction of motion, magnitude and/or direction of acceleration, etc.

Furthermore, it should be understood that while well-defined position and/or orientation values may be useful for certain types of data entities, including but not limited to data entity representing well-defined discrete objects, spatial arrangement properties may take different forms. For example, for a data entity representing a region of rain, fog, light level, etc. a spatial arrangement property for a state thereof may not be limited to a particular point, but might instead define a region. Other arrangements also may be equally suitable.

It is noted that a spatial arrangement property is not required to be comprehensive or exhaustive, and need not include all available spatial arrangement information for a data entity. That is, while a particular data entity might have both a position and an orientation, a spatial arrangement property for a state thereof may not necessarily include both position and orientation.

Returning to FIG. 1, and with reference to step 104B, other state properties may include, but are not limited to, the shape, dimensions, surface texture, and/or color of a data entity. State properties also are not limited only to individual features; for example, a photographic representation or 3D model might be considered a state property of a data entity. Likewise, text or other non-visual data may be considered as a state property. State properties and implications thereof are further described subsequently herein.

In summary, the step of establishing a state 104 for a data entity includes establishing a state time 104A, substantially representing the time at which the state is established 104, and establishing state properties 104B that describe to at least some degree the state of the data entity as of the state time (typically but not necessarily including a spatial arrangement of the data entity). A state thus represents in some sense a representation of a moment in time for a data entity, with information describing the data entity at that moment, e.g. where the data entity was, how the data entity appeared, etc.

Moving on in FIG. 1, the data entity is stored 108. As the data entity is a data construct, typically though not necessarily the data entity may be stored on some form of digital medium such as a data store, e.g. a hard drive, solid state drive, optical drive, cloud storage, etc. However, other arrangements may be equally suitable, including but not limited to retaining the data entity in on-board memory of a processor.

The state is also stored 110. As with the data entity itself, the state typically though not necessarily may be stored on some form of digital medium such as a data store, e.g. a hard drive, solid state drive, optical drive, cloud storage, etc., though other arrangements may be equally suitable, including but not limited to retaining the state in on-board memory of a processor.

Storage of the data entity and/or states therefor must be sufficient so as to enable subsequent output thereof at a subsequent output time (described in detail later herein). However, it is emphasized that storage is not required to permanent, nor is storage required to be of any particular duration. Moreover, for purposes of establishing a data entity and a state therefor, the present invention does not require that output actually take place, so long as output at some output time is practicable for the stored data entity and stored state.

Figure 2:
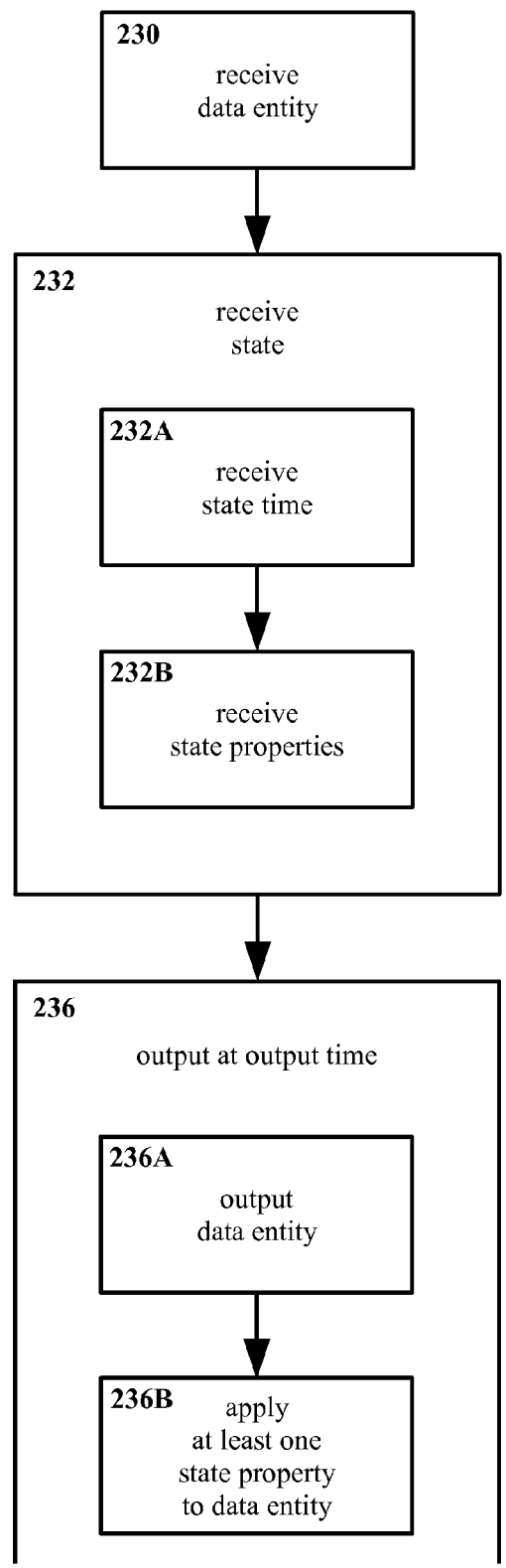
FIG. 2 shows an example method for outputting associated content for an entity according to the present invention.

Turning now to FIG. 2, an example method for outputting associated content for an entity according to the present invention is shown therein.

In the method shown in FIG. 2, a data entity is received 230 in a processor.

In addition, a state is received 232 for the data entity. As with establishing a state 104 in FIG. 1, receiving a state 232 in FIG. 2 may for illustrative purposes be considered as two sub-steps, receiving a state time 232A and receiving state properties 232B for the data entity. However, it is again emphasized that in at least some embodiments the sub-steps may be executed together, simultaneously, in parallel, etc., and are not necessarily required to be executed as distinct steps.

A state time, as previously described with regard to FIG. 1, is a time reference for when the state is established. A state property, as also previously described with regard to FIG. 1, is some feature of the data entity itself or that is or may be associated with the data entity, and/or that provides some degree of information regarding the data entity, the association of the data entity with other entities, other data, etc., or that otherwise describes the data entity.

It is not required that a state be received 232 with all of the state properties that were initially established for that state. While for at least some embodiments it may be desirable to receive all available information, that is, all of the state properties that were established for that state, for other embodiments it may be useful to limit the number of state properties that are received and/or considered, for example to reduce processing requirements, to avoid overtaxing slow data connections or slow storage systems, or for other reasons.

The present invention is not particularly limited with regard to how or from what source the data entity and/or the state is received. The data entity might be received from another processor, from a data store such as a hard drive or cloud storage, from a communications link such as through wired or wireless communication, etc. Other arrangements may be equally suitable. In certain embodiments, a data entity may be considered to be "received" if that data entity is generated by or within the processor in question itself. Just as the manner by which a data entity is established as described with respect to FIG. 1 as limited only insofar as the need for a functional data entity to be made manifest within a processor as described therein, likewise for the arrangement of FIG. 2 the manner by which the data entity is received also is limited only insofar as the need for a functional data entity to come to be present in some fashion within a processor.

Insofar as a distinction may exist between establishing an entity and a state in as shown in FIG. 1, and receiving an entity and a state in as shown in FIG. 2, with respect to establishing a data entity and a state content is to be associated, i.e. the state (and thus the state time and state properties) is being associated with the data entity, while with respect to receiving a data entity and a state the association of content is already accomplished, that is, the state is associated with the data entity.

Returning to FIG. 2, with the data entity received 230 and the state received 232 an output is executed 236 at an output time. Outputting may for illustrative purposes be considered as two sub-steps, outputting the data entity 236A and outputting the state properties applied thereto 236B. However, with regard to outputting 236 in at least some embodiments the sub-steps may be executed together, simultaneously, in parallel, etc., and are not necessarily required to be executed as distinct steps.

Thus, for illustrative purposes it may be considered that the data entity is outputted 236A. That is to say, insofar as the data entity includes therein information in a form as may be outputted, that information is outputted. However, as previously described state properties of a data entity are part of a state, that state being associated with the data entity. For at least some embodiments, few if any properties suitable for output may be part of the data entity itself. For example, if the properties desired to be outputted will be stored within the state as state properties, there may be no need to duplicate such information within the data entity proper. It is even possible that for at least some embodiments, the data entity may be nothing more than an identifier, e.g. a name assigned to designate a virtual reality object, augmented reality object, etc., with little or no additional data incorporated therein.

Continuing in FIG. 2, at least one of the state properties is applied to the data entity 236B and outputted. For example, for an arrangement wherein state properties include a 3D model, a position, and an orientation, the data entity may be outputted as having and/or being represented by that 3D model, in that position, with that orientation. In effect, the data entity, having had applied thereto state properties from a state that was established at a state time, essentially represents the data entity as the data entity existed at the state time. The result may be considered to present a snapshot of the data entity as the data entity existed at some moment in time.

It is not required that all of the state properties received for a state be applied to the data entity 236B as part of output 236. While for at least some embodiments it may be desirable to apply and/or output all available information, that is, all of the state properties that were received for the state, for other embodiments it may be useful to limit the number of state properties that are applied and/or outputted, for example to reduce loads on graphic processors, to avoid cluttering a display or other device outputting the information, or for other reasons.

It is emphasized that the output time may be, and typically though not necessarily will be, different from the state time. That is to say, a data entity typically will be outputted with a state associated therewith at a time other than the time at which that state was established.

In addition, it is noted that the output time represents a time when the entity is outputted along with the state therefor. Unlike the state time, which as part of a state is associated with a data entity (the state time thus typically although not necessarily being stored as part of the state), the output time is not necessarily associated with the data entity in any lasting fashion, nor necessarily with any state associated with the data entity. While associating an output time with a state, with a state time, and/or with a data entity is not prohibited (e.g. logging each output of the state and associating the output times with the state), for at least some embodiments the output time may neither be recorded nor associated with any other data.

Figure 3:
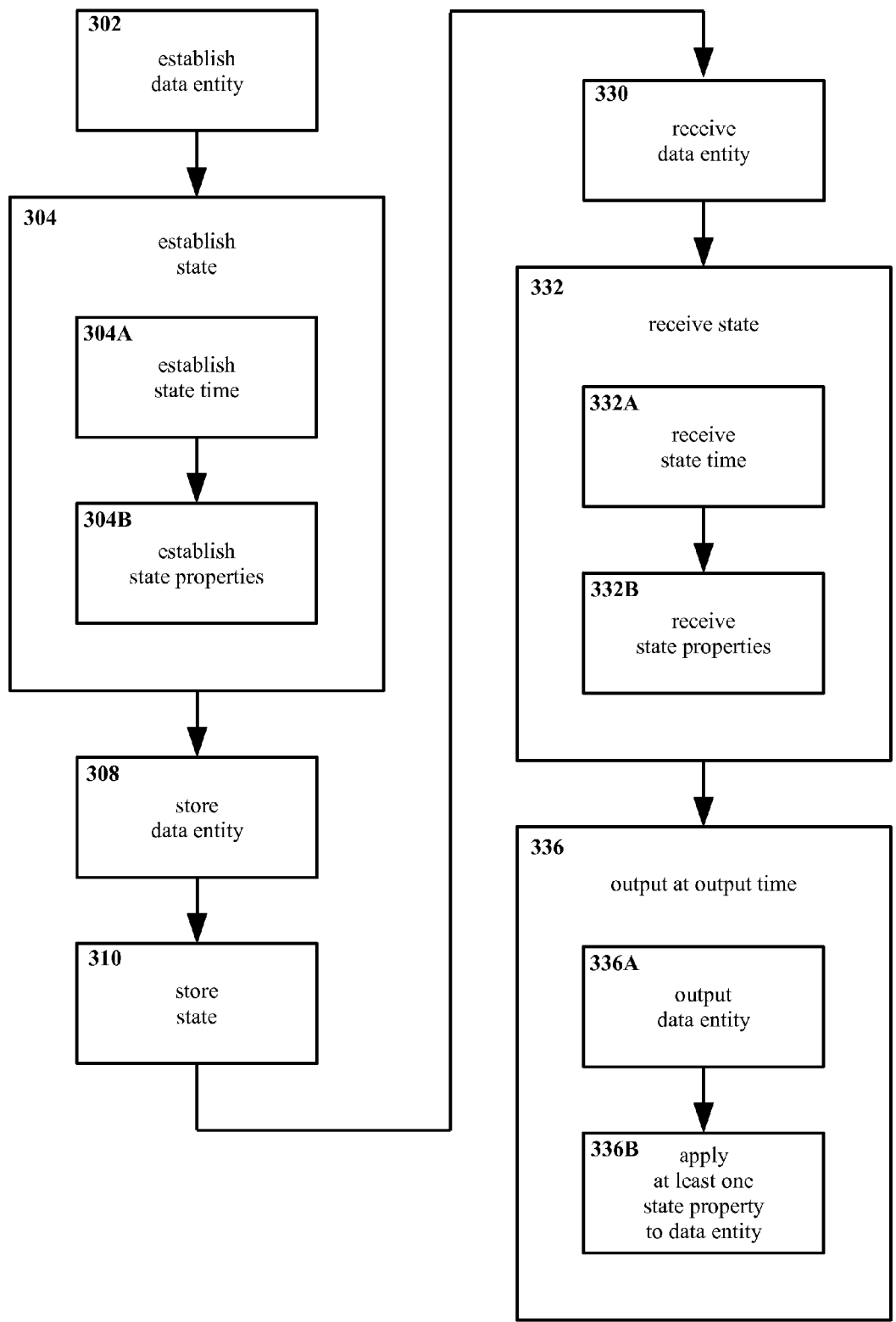
FIG. 3 shows an example method for associating content for an entity and outputting the associated content for the entity according to the present invention.

Moving on to FIG. 3, an example method for associating content for an entity according to the present invention and outputting associated content for the entity according to the present invention is shown therein. The arrangement in FIG. 3 is at least somewhat similar to both the arrangements shown in FIG. 1 and in FIG. 2, with FIG. 3 representing a combined approach wherein content is both associated and outputted with the association. It will be understood, for example in view of FIG. 3, that although the establishing and storing of entities and states according to the present invention and the receiving and outputting of entities and states according to the present invention may be executed separately, e.g. with different hardware, for different users, and/or at different times, the establishing, storing, receiving, and/or outputting of entities and states according to the present invention also may be executed together in a substantially continuous fashion.

In the method shown in FIG. 3, a data entity is established 302. A state is also established 304 for the entity. As noted previously, establishing the state 304 may be considered as sub-steps of establishing a state time 304A and establishing state properties 304B for the data entity.

The data entity is stored 308. The state also is stored 310. As previously noted, for at least certain embodiments the data entity and/or the state may be stored within a processor itself. Storage thereof is not limited only to hard drives, solid state drives, or other dedicated storage devices, nor is storage required to be permanent nor necessarily even of any particular duration. Storage only requires that the relevant data is retained for sufficient time and in sufficient condition as to enable output thereof.

Moving on in FIG. 3, the data entity is received 330. The state also is received 332. Again, receiving the state 332 may be considered as two sub-steps, receiving the state time 332A and receiving the state properties 332B.

Output is then executed 336 at an output time, the output time being different from the state time. As previously noted, outputting 336 may be considered as two sub-steps, outputting the data entity 336A and applying one or more state properties thereto 336B.

Many variations on the methods shown in FIG. 1 through FIG. 3 are possible within the scope of the present invention. For example, multiple data entities may be associated with states, multiple states may be associated with a single data entity, and states may be outputted in multiple fashions. FIG. 4 through FIG. 7 show examples of certain such variations, though the present invention is not limited only to the variations shown.

Figure 4:
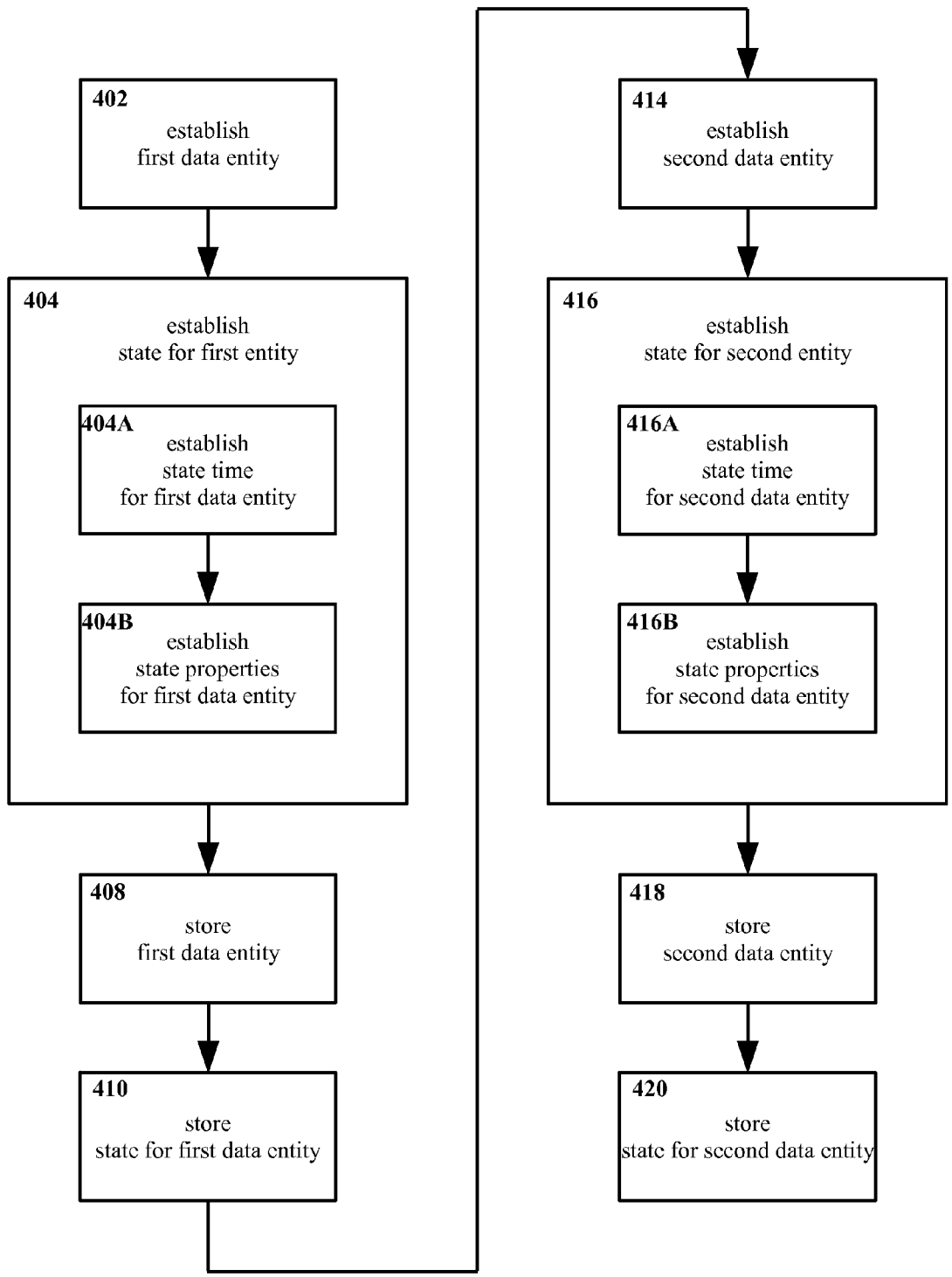
FIG. 4 shows an example method for associating content for multiple entities according to the present invention.

With regard to FIG. 4, therein a method is shown for associating content with multiple entities. In the example arrangement of FIG. 4, a first data entity is established 402. A state is also established 404 for the first data entity. Establishing the state 404 may be considered as sub-steps of establishing a state time 404A and establishing state properties 404B for the first data entity. The first data entity is stored 408, and the state for the first data entity is also stored 410.

Moving on in FIG. 4, a second data entity is established 414. While the second data entity may be, and typically is, a distinct data entity from the first data entity established in step 402, the second data entity is otherwise defined similarly. That is, the second data entity is an information construct the represents one or more objects, elements, phenomena, locales, environments, etc., and more particularly may be an augmented reality or virtual reality entity. Further discussion regarding data entities is provided above with regard to FIG. 1.

Returning to FIG. 4, a state is established 416 for the second data entity. Similarly to the state for the first data entity, establishing the state 416 may be considered as sub-steps of establishing a state time 416A and establishing state properties 416B for the second data entity. Also similarly, the second data entity is stored 418, and the state for the second data entity is also stored 420.

It should be understood that just as multiple data entities may be established and stored in association with states therefor, multiple data entities similarly may be received and outputted with states therefor.

Generally, the present invention is not limited insofar as how many data entities may be associated with states therefor. However, the example arrangement of FIG. 4 may illuminate certain possible features of the present invention, related to the ability to associate multiple entities with states therefor.

For example, for an arrangement wherein multiple data entities are associated with states therefor, it becomes possible to effectively capture states for a group of entities. Possible groups might include similar entities, e.g. all entities within some radius of a given position, all entities created by a single source, all entities with a similar feature such as color, size, identity, etc. Other groupings are also possible.

In particular, it is noted that multiple data entities may be associated with states wherein those states have substantially the same state time. That is, if a state may be considered to be a snapshot of a single data entity at a moment in time, by associating multiple data entities with states having substantially the same state time it becomes possible to effectively retain snapshot of a group of entities at a moment in time. Thus, it is likewise possible to receive and output those data entities all with states having substantially the same state times associated therewith. One result of such association, storage, and output is that a group of data entities may be portrayed as that group existed at some other moment. To continue the example above, all entities within some radius of a given position might be outputted as those entities existed at some previous moment in time.

Thus, although for simplicity the present invention is at times referred to herein as addressing an individual data entity, it should be understood that the present invention is not limited only to individual data entities. Groups of entities, regions or subsets of larger virtual or augmented reality environments, or potentially even entire virtual or augmented reality environments may be captured at a moment in time, and outputted at some other time with a former state.

Figure 5:
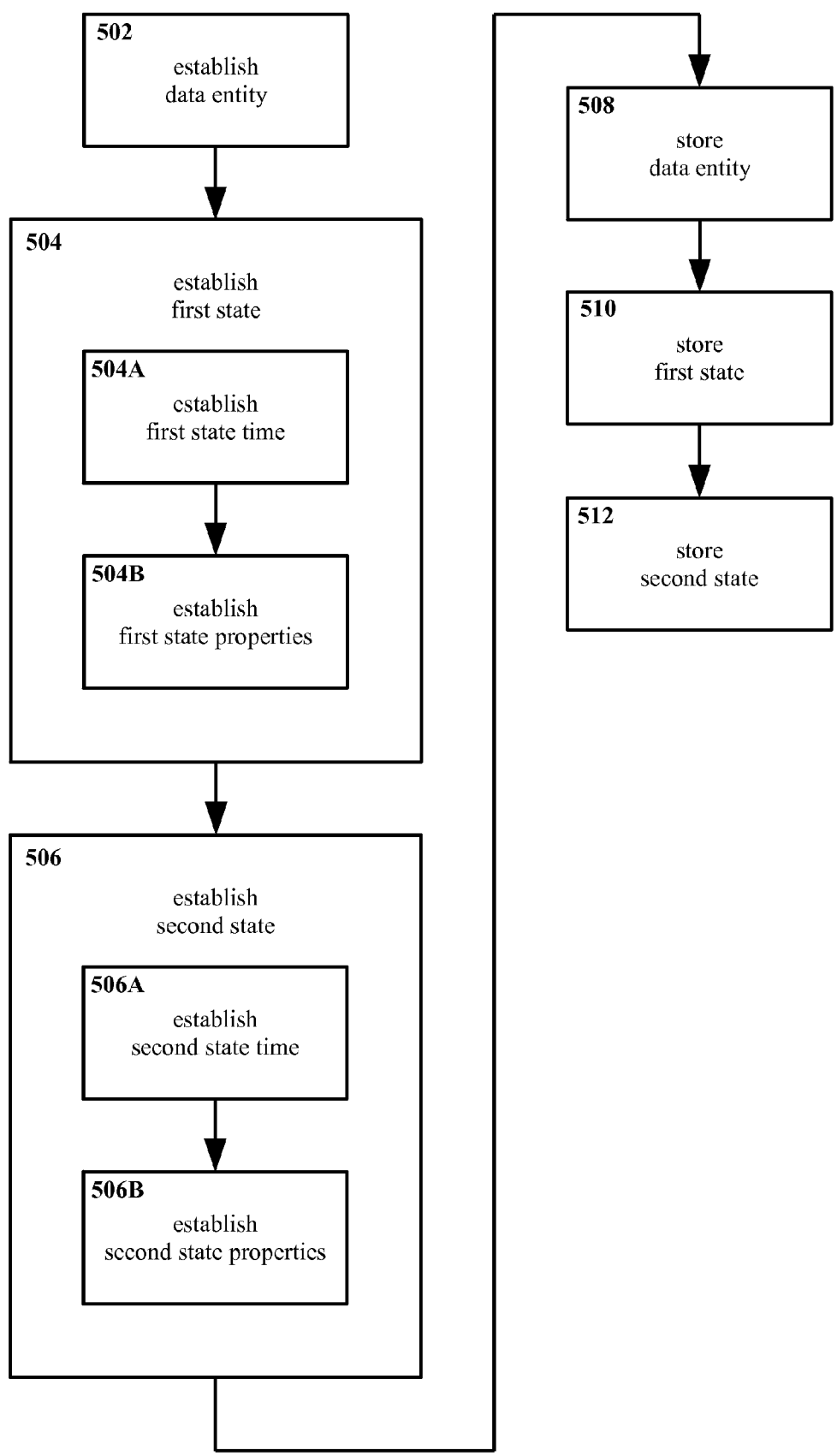
FIG. 5 shows an example method for associating content for multiple states for an entity according to the present invention.

Moving on to FIG. 5, therein a method is shown for associating a data entity with multiple states therefor. In the example arrangement of FIG. 5, a data entity is established 502. A first state is established 504 for the data entity. Establishing the first state 504 may be considered as sub-steps of establishing a first state time 504A and establishing first state properties 504B for the data entity.

A second state is also established 506 for the data entity. Establishing the second state 506 likewise may be considered as sub-steps of establishing a second state time 506A and establishing second state properties 506B for the data entity.

Moving on in FIG. 5, the data entity is stored 508. The first state for the data entity is stored 510, and the second state for the data entity is also stored 512.

As may be seen from the example of FIG. 5, a given data entity may be associated with multiple states therefor. It is emphasized that the present invention is not particularly limited with regard to how many states a given date entity may have. The number of states for any data entity may be as small as one, or may be arbitrarily large. Since each data state represents, in effect, the state of the data entity as of the state time, each data state may be taken to represent the status of the data entity at some moment in time. Multiple states thus may be taken to represent multiple moments in time for a data entity. Alternately, multiple states for a data entity might be considered to represent a history for the data entity.

The ability to retain a history for data entities is one advantage of the present invention. It will be understood that a history need not be perfect or comprehensive in order to be useful. That is to say, not every event, change, etc. for a data entity must be or necessarily will be represented by a state therefor. However, representing every change, event, etc. also is not prohibited, and for at least certain embodiments it may be advantageous to retain a complete log of changes to a data entity according to the present invention. Such a log might be considered at least somewhat analogous to a wiki page history, wherein each change to the page is logged and recorded with the time the change is made. Such functionality may be implemented through the use of the present invention for virtual reality and/or augmented reality entities.

Although FIG. 5 shows a single continuous arrangement wherein the second state is established immediately after the first state, this is done for illustrative purposes only. The present invention is not limited only to establishing states immediately one after another, nor is there any particular limit regarding how much time may pass (or how many changes may occur to the data entity) between the establishment of consecutive states.

Furthermore, for embodiments wherein multiple data entities are associated with states therefor (as in FIG. 4), establishing a state for one such entity does not require that a corresponding state be established for another such entity. Different entities are not required to have states with the same state times, or to have the same number of states. Although for certain embodiments it may be useful to regularly (e.g. at some standard interval) establish states for some or all data entities substantially at the same state times, such an arrangement is not required.

Figure 6:
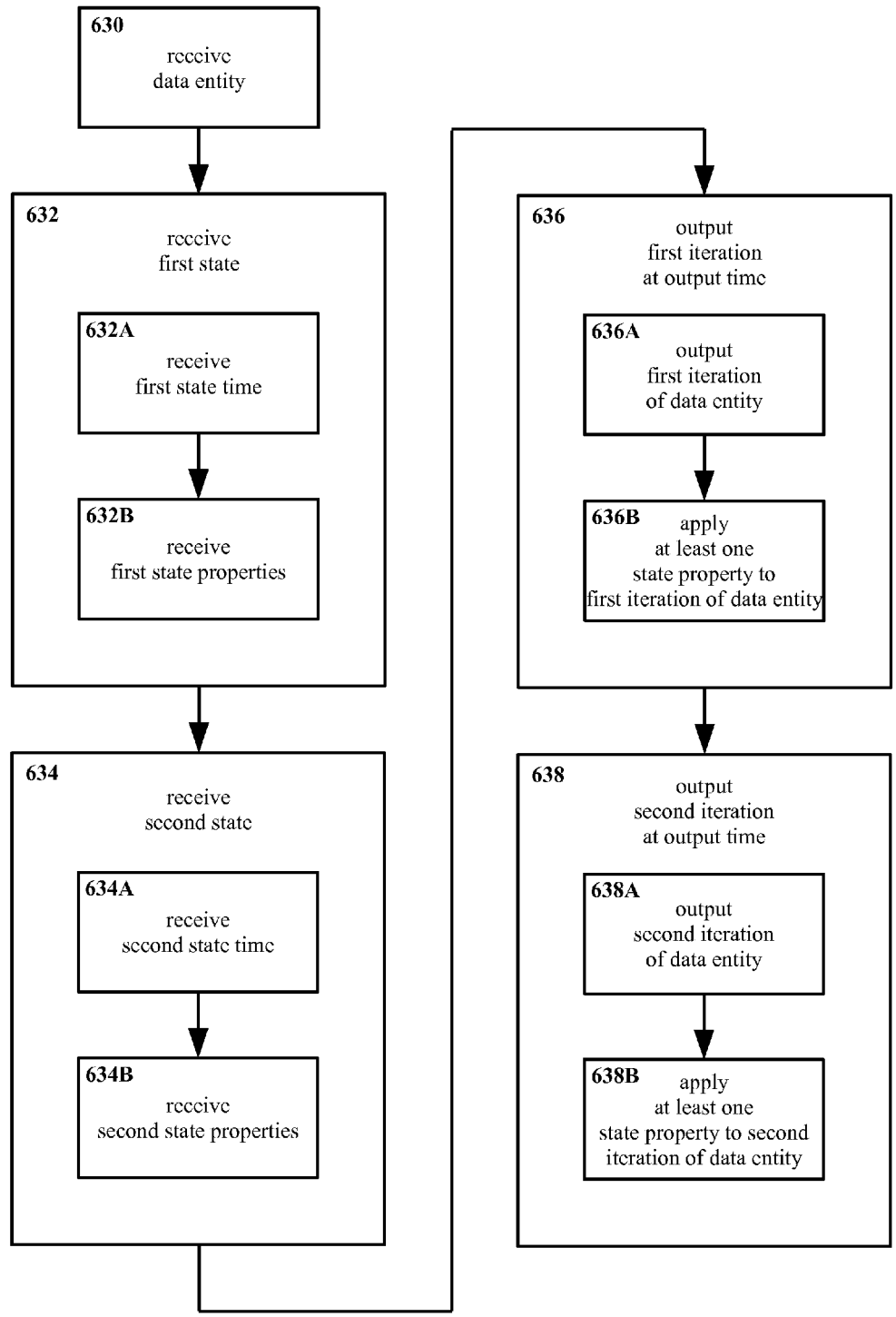
FIG. 6 shows an example method for outputting associated content for multiple states of an entity in multiple iterations thereof according to the present invention.

Turning now to FIG. 6, an example method for outputting associated content for multiple states of an entity in multiple iterations according to the present invention is shown therein.

In the method shown in FIG. 6, a data entity is received 630 in a processor.

In addition, a first state is received 632 for the data entity. Receiving the first state 632 may for illustrative purposes be considered as two sub-steps, receiving a first state time 632A and receiving first state properties 632B for the data entity.

A second state also is received 634 for the data entity. Receiving the second state 634 also may be considered as two sub-steps, receiving a second state time 634A and receiving second state properties 634B for the data entity.

An output of a first iteration of the data entity is executed 636 at an output time. With regard to iterations, it should be understood that the data entity, being information, may be outputted multiple times, so as to be present within a virtual or augmented reality environment as multiple iterations of the same data entity. The first iteration of the data entity is outputted in conjunction with the first state. Outputting the first iteration may be considered as two sub-steps, outputting the first iteration of the data entity 636A and outputting the first state properties applied thereto 636B.

An output of a second iteration of the data entity also is executed 638 at the output time. The second iteration of the data entity is outputted in conjunction with the second state. Outputting the second iteration also may be considered as two sub-steps, outputting the second iteration of the data entity 368A and outputting the second state properties applied thereto 638B.

It is pointed out that both the first and the second iterations are outputted at the output time. Thus both iterations are outputted substantially at the same time. The data entity is in effect outputted as two copies thereof, in two different states: once in the first state, and once in the second state. Multiple iterations of the data entity may thus be visible within the virtual reality environment and/or augmented reality environment. The first and second iterations may be compared, whether side-by-side, overlaid, or in some other fashion.

It will be understood that the present invention is not limited only to two iterations of any particular data entity. An arbitrarily large number of data entities may potentially be outputted at any given time.

Figure 7:
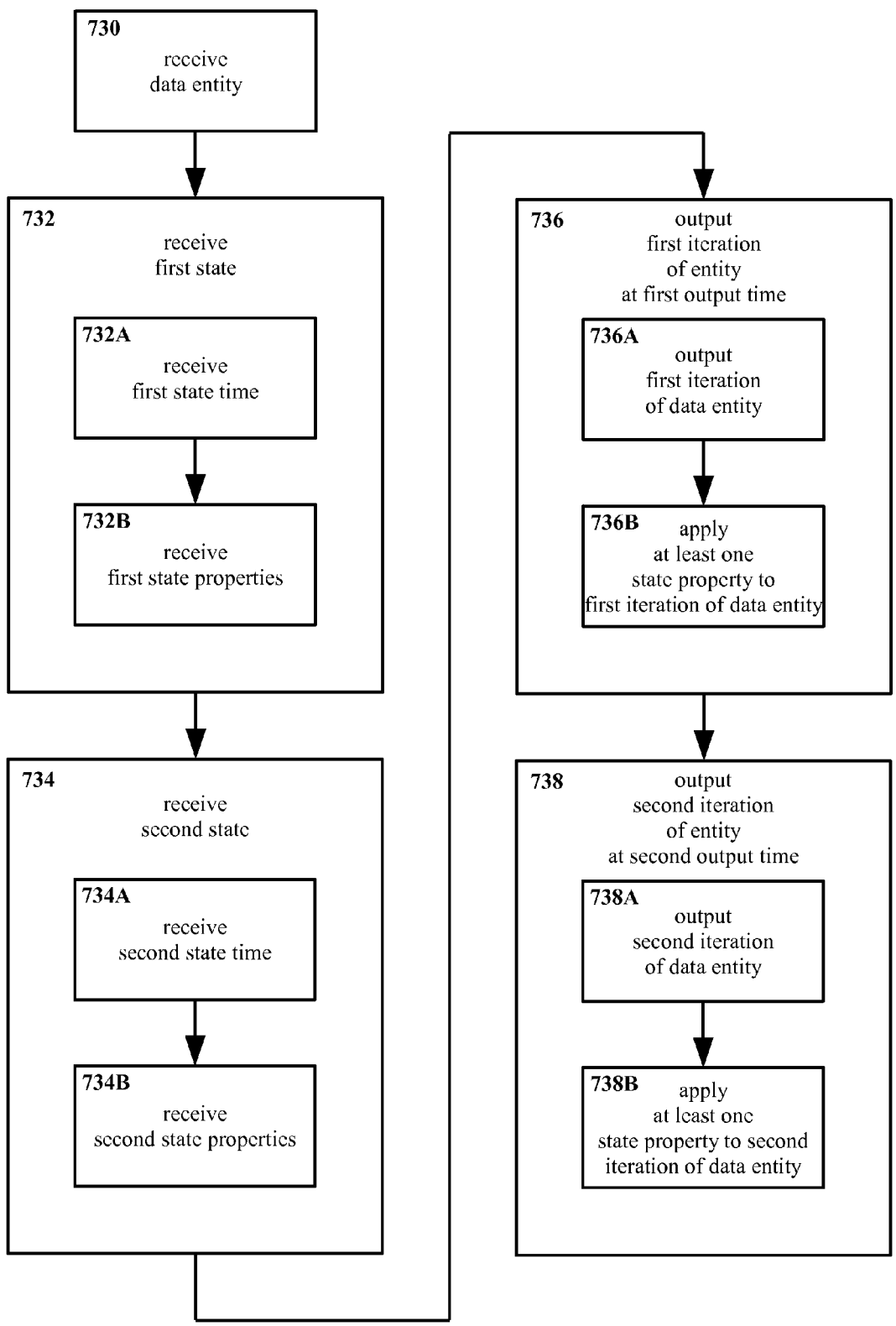
FIG. 7 shows an example method for outputting associated content for multiple states of an entity in a multiple iterations at different times according to the present invention.

Turning now to FIG. 7, an example method for outputting associated content for multiple states of an entity in a multiple iterations at different times according to the present invention is shown therein.

In the method shown in FIG. 7, a data entity is received 730 in a processor.

A first state is received 732 for the data entity. Receiving the first state 732 may for illustrative purposes be considered as two sub-steps, receiving a first state time 732A and receiving first state properties 732B for the data entity.

A second state also is received 734 for the data entity. Receiving the second state 734 also may be considered as two sub-steps, receiving a second state time 734A and receiving second state properties 734B for the data entity.

An output of a first iteration of the data entity is executed 736 at a first output time. The first iteration of the data entity is outputted in conjunction with the first state. Outputting the first iteration at the first output time may be considered as two sub-steps, outputting the first iteration of the data entity 736A and outputting the first state properties applied thereto 736B.

An output of a second iteration of the data entity also is executed 738 at a second output time. The second iteration of the data entity is outputted in conjunction with the second state. Outputting the second iteration at the second output time also may be considered as two sub-steps, outputting the second iteration of the data entity 738A and outputting the second state properties applied thereto 738B.

It is pointed out that the first and second iterations are outputted at first and second output times (as opposed to the arrangement of FIG. 6, wherein both iterations were outputted at the same output time). Thus the two iterations are outputted substantially sequentially. The data entity is in effect outputted as two copies thereof, in two different states, at two different times: once in the first state, and once in the second state.

To a person viewing the output, the appearance will depend on the particulars of the states and any choices made with regard to output. If the first and second iterations are outputted with the same location and orientation, and output of the first iteration stops substantially at the time that output of the second iteration begins, the appearance to a viewer would be of the outputted data entity changing between the first and second states. Essentially, a stationary animation of the data entity would be outputted (albeit only a two-frame animation for only two states).

However, if the first and second iterations are outputted with different locations and/or and orientations (for example, if the two states have different spatial arrangement properties and are outputted therewith), and output of the first iteration stops substantially at the time that output of the second iteration begins, a mobile animation of the data entity would be outputted (albeit again only a two-frame animation for only two states).

If output of the first iteration does not stop when output of the second iteration begins, two iterations may be present at once, whether side-by-side, overlaid, etc., in a manner similar to that described with regard to FIG. 6.

It will again be understood that the present invention is not limited only to two iterations of any particular data entity for the example arrangement as described with regard to FIG. 7. An arbitrarily large number of data entities may potentially be outputted, for example providing potentially long and/or detailed history animations of a data entity.

Again, at this point it may be useful to elaborate on certain implications of the functionality of the present invention. In associating states with data entities over a period of time, a record of the status of those entities over time is created. In outputting data entities with states having state times different from the output times (e.g. different from the present), it is possible to view or otherwise interact with a data entity, or a group of data entities, as that data entity or data entities was at some point in the past. The effect might be compared to a "virtual history machine".

As an example, consider an arrangement of a group of virtual objects in the vicinity of some location within a virtual or augmented reality environment. By establishing multiple states for the virtual objects over a period of time, and storing those states and the virtual objects, data representing a record of those virtual objects over that period of time is accumulated. In response to a command from a user of the virtual or augmented reality environment, and/or in response to some other stimulus, the virtual objects may be outputted substantially in the state that the virtual objects were in at some earlier time.

It is noted that as previously described, one of the state properties established typically is a spatial arrangement for a given data entity at a particular state time. Thus, the position, orientation, etc. of the data entities for a given state time typically is known. As a result, data entities may be outputted not merely with properties such as their appearance at a particular state time, but in the position, orientation, etc. that those data entities exhibited at the corresponding state time. Thus one or more data entities may be outputted substantially in the condition those data entities exhibited, in the positions and orientation that those data entities exhibited, as of a particular state time.

In so doing, from the perspective of the user, the user effectively reconstructs an arrangement of a previous time so far as a virtual or augmented reality environment is concerned. (More precisely the environment has been reverted to a state corresponding to an earlier time, however the effect is similar so far as a viewer is concerned.) Through the use of the present invention, the user therefor might be considered to have the use of a virtual (and/or augment) history machine, since groups of data entities, virtual or augmented reality scenes, even entire virtual or augmented reality environments may be reconstructed substantially as at some earlier moment.

However, although storing and outputting entities and associated states within a region and/or with original spatial arrangements may be useful for certain embodiments, the present invention is not limited only to spatial groups or to original spatial arrangements. Although typically the spatial arrangement of a data entity is established as a state property for a state thereof, the present invention does not require all state properties to be stored or outputted. Thus, it is for example possible to output data entities with certain properties as those data entities exhibited at a previous time (the state time), but not necessarily with all such properties. As a more particular example, it is possible to output a data entity with the appearance, color, etc. as at a state time, but in a different position and/or with a different orientation than that entity exhibited at that state time.

In addition to being outputted with different spatial arrangements, entities can be outputted at a single output time with different state times, with some but not all of the state properties from a particular state, etc. The "virtual history machine" functionality thus is more flexible than simply reenacting earlier times, in that the present invention is not limited to showing objects, scenes, environments, etc. in entirety as at some earlier time, but rather individual data entities may be collected, rearranged, tailored insofar as selection of properties, outputted with some properties but not others, etc.

For example, a user might reconstruct a region of a virtual environment as that environment existed two weeks previously (i.e. by outputting the data entities that were present, in the state that those data entities were present), while the user is in that region of the virtual environment. However, the user might also reconstruct the same region of the virtual environment while the user is in a different region, or potentially in an entirely different virtual and/or augmented reality environment. Moreover, the user might reconstruct individual elements of the from the region (i.e. some but not necessarily all data entities therein), with elements not originally present, with changes in the position, orientation, and/or other properties of certain elements, etc.

It is noted that such functionality provides one example of sharp contrast between the present invention and a "game save" function. The term "game save" typically implies an arrangement that is limited to restoring an entire "world" precisely as at a particular time, with no variation in what elements might be present, where those elements might be, what condition those elements might be in, where the user/avatar (if any) might be, whether other users/avatars might be present, etc. By comparison, although the present invention enables such "no changes" restorations, the present invention is not limited only to exact states for entire environments, and so provides much greater flexibility. In the present invention, depending on the specifics of a particular embodiment, a user is instead provided with numerous options regarding what can be restored, how, under what conditions, and so forth, functionality entirely unlike a game save (and that functionality being beyond the ability of a game save to provide).

As previously noted, the range of potential features or information that may be established as state properties (and that may be stored, received, and outputted) is extremely large. In principle, any information that describes a data entity, a behavior of a data entity, a relationship of a data entity with something else (e.g. a user, another data entity, a physical object, etc.), or some other aspect of the data entity may be established as a state property. Likewise, for data entities that have a parent entity and/or that depict or otherwise represent that parent entity, any information that describes the parent entity, the behavior of the parent entity, the relationship of the parent entity with something else, etc. also may be established as a state property.

State properties may, for example, include visual representations of some or all of a data entity, such as an image, video, 2D models, 3D models, other geometry, etc. State properties may include representations with respect to other senses, such as audio information, tactile information, texture, olfactory information, etc.

State properties may include features of visual or other sensory information, either in addition to or in place of visual or other sensory representations. For example with regard to visual phenomena color, color distribution, one or more spectra or spectral signatures, brightness, brightness distribution, reflectivity, transmissivity, absorptivity, and/or surface appearance (e.g. surface texture) might serve as state properties. Environmental conditions such as degree of illumination, direction of illumination, color of illumination, etc. also might serve.

State properties also may encompass features of the output of a data entity, and/or of the system outputting the data entity. For example, features such as image resolution, whether the data entity is animated, frame rate, color depth (i.e. the number of bits used to represent color), audio sampling rate, etc. might be utilized as state properties.

Properties that are not necessarily directly perceivable by human senses also might be utilized as state properties. For example, temperature, temperature distribution, composition, chemical concentration, electrical potential, electrical current, mass, mass distribution, density, density distribution, and so forth may be considered as state properties for certain embodiments.

Moreover, information that may be considered an abstraction also might be considered when establishing state properties. Features such as whether a data entity is present in a certain location, whether the data entity is visible (e.g. resolved or outputted within the system; not all data entities are necessarily outputted or visible at all times even when technically present with the processor managing a virtual or augmented reality environment, for example), a number of instances of a data entity that may be present (in certain virtual and/or augmented reality environments some or all data entities may be instanced, that is, multiple copies thereof may be outputted at once), etc. may be utilized.

One notable example of an abstraction that could be considered as a state property might be the identity of the data entity. That is to say, what is the data entity, and/or what does the data entity represent? It will be understood that the identity of a data entity may refer, at least partially, to a parent entity as well; a data entity that is based on a parent entity in the form of a physical-world chair might for certain purposes be identified as "a data entity", but might more usefully be identified as "a data entity representing the chair" (perhaps with additional information to specify which physical-world chair is being represented). Similarly, a data entity that is meant to represent a table but that is not based on any particular parent object might reasonably be identified as "a data entity representing a table" (again perhaps with additional information to specify which type of table is represented). For at least some embodiments, it may be sufficient to identify such data entities as simply "representing the chair" and "representing a table", or even "chair" and "table", since the identify of a data entity as a data entity may under at least some conditions be considered to be self-evident. (For example, if a data entity representing a chair is disposed on a digital processor, it is arguably self-evident that the data entity is indeed a data entity, or at the least that the data entity is not a physical chair that has somehow become disposed on a digital processor.)

Another notable example of an abstraction might be to associate useful information regarding a physical object with a data entity that is established using that physical object as a parent entity. For example, a wiring schematic for an electronic device might be established as a state property for such a data entity. In calling up the state, a user might call up the wiring schematic, thus conveniently accessing information relevant to manipulation of the parent object. For certain embodiments, it may be useful to also utilize spatial arrangement properties so as to position the wiring schematic to overlay the physical wiring that the wiring schematic represents. Similar arrangements could be made with regard to mechanical devices (e.g. for proper operation and/or for repair), for exercise equipment (e.g. presenting schematics for proper form overlaid over the equipment and/or the user's own body or avatar), etc.

At this point it is pointed out that the ability to determine a spatial arrangement for a data entity—as previously noted with regard to state properties, the spatial arrangement property being typically established for at least most states for at least most data entities—may for at least some embodiments imply the ability to determine, e.g. through the use of sensors, the position of data entities. Similarly, if such data entities are to be established from physical-world parent entities, such sensors and/or other means for establishing spatial arrangements may also be suitable for establishing spatial arrangements for physical world objects. Thus, with respect to the above example regarding overlaying schematics or other information, at least certain embodiments of the present invention may facilitate such overlay without additional support. It should be understood that such ability to determine the positions, orientations, etc. of data entities and/or physical objects can support additional richness insofar as augmented reality, i.e. interactions between physical and non-physical objects and phenomena.

Returning to example state features, behavioral features of a data entity may be used as state properties, such as whether a data entity is mobile, whether the data entity is in fact moving, the speed, direction, acceleration, etc. of motion (if any), whether the data entity is subject to forces such as gravity and/or to analogs of such forces, whether the data entity reacts as a solid object when touched (as opposed to allowing other objects, users, etc. to pass therethrough, for example), etc.

Data not directly related to the outputting of a data entity also may be considered when establishing state properties. For example, text and numerical data of many sorts might be utilized. More specific examples might include RFID data, barcode data, data files of various sorts, executable instructions, hyperlinks, data connections, and communication links all might be considered.

Data for state properties is not limited only to data directly applicable to the data entity. For example, for arrangements wherein the data entity in question is based on a parent entity, such as a physical object, data relevant to the physical object may be incorporated into state properties regardless of whether the data may be directly applicable or even relevant to the data entity in and of itself. For example, many of the properties referred to above—for example, mass—may not necessarily be applied to a data entity within a virtual or augmented reality system (that is to say, a virtual object may not have "mass", e.g. if the virtual reality system does not account for mass in handling virtual objects therein). However, the mass of a parent object might nevertheless be considered in establishing a state property. The data entity thus might have a mass state property associated therewith, regardless of whether the data entity itself has mass or even any behavior features analogous to mass.

In addition, still with regard to properties that do not necessarily apply directly to the data entity itself, information other than physical features also may be considered when establishing state properties. For example, the price of a parent entity, nutritional information for a parent entity, user reviews of a parent entity, etc. might be utilized as state properties.

Data relating not necessarily to a data entity itself but rather to associations of that data entity also may be considered when establishing state properties. For example, who or what created and/or modified a particular data entity, what system (i.e. name, system ID, etc.), processor, operating system, etc. a data entity was created or utilized under at the relevant state time, etc. Likewise, if the data entity is associated with something else (e.g. another data entity) as of the state time, such an association might be considered in establishing state properties. As an example of the previous, "ownership" of a data entity by a particular user might be considered such an association. Other associations might include whether a data entity was in contact with something else, whether the data entity contained or was contained by something else (consider for example a virtual chest with virtual objects therein), etc. Associations could potentially be relatively abstract, for example "was an avatar present within 50 feet at the state time?", or even "was a specific avatar present and running within 50 feet at the state time?"

The present invention is not limited only to preceding example state properties. Other state properties and/or data therefor may be equally suitable.

Typically though not necessarily, a state property may be defined before data is acquired for the property, i.e. a determination might be made that one of the state properties for a particular data entity or group of data entities will be a 3D model, or a color distribution, etc. Other definitions might also be made, for example the degree of precision for a state property, the type of 3D model to be used, the color model used for a color distribution (such as RGB, CYMK, or some other model).

Regardless, any data needed to establish a state property may be acquired in many ways. The data in question could be obtained using one or more sensors adapted to sense properties of a parent object if the parent object is a physical object, a virtual or augmented reality object that is outputted so as to be sensible, etc. A wide variety of sensors may be suitable, depending on the particulars of a given embodiment, the nature of the parent object or other target to be sensed, the nature of the state property, etc.

Data needed to establish a state property also might be received from some source, e.g. in digital form suitable for use by a processor. Such data might be retrieved from a data store such as a hard drive or solid state drive, might be received from online or "cloud" storage, might be obtained via a communication link such as a wifi modem or other wireless system, a data cable, etc.

In other instances data might be read from a parent entity. For instance, a parent entity that is a 3D virtual object might include, as part of the data making up that virtual object, information that describes the 3D shape of the virtual object. For an embodiment where such data is sufficient for purposes of establishing a state property, the data might be read from the virtual object itself, obtained from a processor controlling the virtual object, etc.

In yet other instances data for establishing a state property might be generated, for example inside a processor. One example wherein this might be performed would be an arrangement wherein a virtual or augmented entity is produced (or at least modified) by a processor; in such case the processor may generate the data needed to create the data entity, and that created data might also be sufficient to establish one or more state properties that describe the data entity for the purposes of the present invention (whether or not the original intention in creating the data entity was to use or support the present invention).

Further, state properties might be established by a user interacting with a virtual reality or augmented reality environment. For example, state properties addressing information such as price, identity, reviews, etc. might be established and/or data entered therefor by a user. A user might enter a price to be associated with a data entity (such as a data entity representing a product or service available for purchase), might identify a data entity and enter that identity as a state property (again keeping in mind that the identity of a data entity may reference and/or include the identity of some parent entity), might compose and associate a review with an entity as a state property therefor, and so forth.

The present invention is not limited only to preceding example arrangements described for establishing state properties. Other arrangements for establishing state properties may be equally suitable. It should be understood that the particulars regarding how state properties may be established may depend to at least some degree on the specific embodiment, the properties themselves, the data entities, etc.

As with the state properties and the approaches for establishing state properties, the potential applications of the present invention are many and varied. Certain functions with regard to the "virtual history machine" functionality have already been noted, such as the ability to view data entities, groups of data entities, areas within virtual and augmented reality environments, etc. in previous states as at other times. However, the ability to attach certain state properties also facilitates other functions, including but not limited to the following.

For example, users, programs running on a processor, and/or other actors may associate information with an existing data entity. For a data entity representing, for example, a product or a service, a user or other actor might establish a state for the data entity and attach an annotation such as a review as a state property for that state. Other users might then be able to call up the state for the data entity at another time, so as to see the review of the product or service. Such content may be arbitrarily searchable, that is, a user might use a search engine to find reviews for Italian restaurants from distant some point within (or even outside of) the virtual or augmented reality environment. Suitable indexing of data entities, states, state properties, etc. may facilitate such searching.

However, it is emphasized that if a review of a particular Italian restaurant is associated with for example a data entity representing the front door of the restaurant, a data entity representing some point on the sidewalk in front of the restaurant, a data entity representing a billboard advertising the restaurant, etc. (i.e. as part of a state therefor), the review—as one of the state properties—is directly available by recalling a state of the relevant data entity at that location. This is distinct from an abstract or arbitrary search: the present invention enables users to call up and interact with data relevant to their environment by interacting with that environment (i.e. by manipulating data entities therein to access information associated therewith).

Thus, through associating states and state properties with data entities according to the present invention, a high level of data connection and user interactivity is supported for virtual reality and augmented reality environments.

With suitable data entities, and suitable states and state properties associated therewith, many interconnections of information may be implemented. In particular, it may be desirable (though not required) that ordinary users be permitted to initiate establishment of data entities and/or states therefor. That is, the public may be permitted to add content to the environment, and/or to associate content within the environment.

Users may, as noted, associate reviews or other useful information with data entities representing (and/or otherwise associated with) products, services, locations, avatars, etc. Users might also include other sorts of information. Nearly any type of information might be so associated: a data entity representing/associated with a vehicle might have insurance information associated therewith, a data entity representing/associated with a library book might have shelf location, borrowing history, due dates, etc.

As an alternative to establishing new states for existing data entities, for certain embodiments information might be added to a virtual or augmented reality system according to the present invention through establishing new data entities. For example, with regard to the previously referenced restaurant reviews, rather than establishing a new state for a point on the sidewalk in front of the restaurant a user might establish a new data entity, that is, create the review as a data entity unto itself. The review might then be a state property for the review data entity. The user might also create for the data entity some default appearance, perhaps an icon, an image, a symbol or signature personal to the user, etc.

In keeping with the notion of personalizing signatures and/or other features of data entities, it is noted that data entities may be established with different levels of access for different persons, groups of people, search engines, etc. A user might establish a review data entity (or a review state for an existing data entity) that is accessible only to that user, only to individuals that the user specifies, only to persons with a certain access code, etc. Similarly, a user might establish the data review entity (or review state) so as to be visible only to a certain person or persons; anyone not authorized to manipulate the data entity (or state) simply would be unaware of the presence thereof. It is noted that a review entity is an example only; other types of annotations, comments, and information might be established as data entities and/or as states for data entities.

Such restriction may support multiple functions, including but not limited to privacy, security, and convenience. With regard to privacy and security, if a private or secure data entity or state cannot be seen, and/or cannot be opened or accessed, then the information therein cannot be read or copied, and cannot be modified. To continue the previous example of the Italian restaurant, the owner thereof might for example establish the door, posted menu, sidewalk, etc. so as to be accessible read-only, without permitting modifications. Insofar as convenience is concerned, it should be appreciated that as the number of users in a virtual or augmented reality environment increases, the number of user-created data entities and/or states typically will likewise increase. While an individual user might be interested in product reviews by someone they know, sifting through thousands of reviews left by many people may be less useful than having no reviews at all. Furthermore, if reviews or other annotations proliferate sufficiently, there is the potential to choke a virtual or augmented reality to the point that efficient navigation therein and/or effective use thereof become difficult or impossible.

As a further note with regard to avoiding such "clutter", for certain embodiments it may also be useful to enable expiration times and/or other limits on the existence (or at least the usual output) of certain data entities and/or states. For example, an annotation entity posted within an augmented reality environment regarding how best to avoid road construction on a particular street may become pointless or confusing once that episode of road construction is complete. The data entity might be established with a termination time, after which the data entity is deleted, no longer appears unless examining a state time earlier than the termination time, etc.

Another function that may be facilitated by at least certain embodiments of the present invention relates to an ability to sense activities. As previously noted, state properties may relate to activities with regard to concerns such as "is someone running within some distance thereof?" Similarly, states and state properties may be established related to whether a particular individual, such as the user (or one user) of the virtual or augmented reality environment, is performing some action. If, for example, a user picks up a real-world object associated with some data entity, and the user then moves the real-world object, then a new state might be applied to that data entity, and/or to a data entity representing the user's avatar. As a more particular example, consider that the real-world object is a product in a store. If the user picks up the object and leaves the store, a state may be assigned to the data entity that the object has is to be (or has been) purchased by the user. A financial transaction may be carried out on the basis of such data associations (assuming acquisition of suitable data for determining whether the user is indeed performing such actions). From the point of view of the user, the user would be able to purchase an item merely by picking it up and taking it, without the need to check out (since the appropriate data manipulations and associations would be handled with regard to the relevant data entities). Such an arrangement might be referred to as "carry and pay" (or perhaps even "look and pay" for embodiments that do not require physical transport of the object by the user; one such arrangement might include software purchase, wherein the software would automatically download and no physical object would be carried or would even necessarily be physically present at all).

Other behaviors and functions also may be associated with data entities, states, and state properties, may be implemented, and the present invention is not particularly limited with respect thereto.

With regard to implementation, there may be many ways to implement the functions of the present invention as described herein, and the present invention is not particularly limited in that regard. For example, one approach might be to establish a 3D "language" for establishing, manipulating, and associating data entities, states, and state properties. Support for establishing states, state times, and other state properties associated with data entities might readily be written into such a language, in much the same way that functions for facilitating convenient use of conventional websites are written into HTML and similar web languages. However, other approaches may be equally suitable.

Whether using such a 3D language or not, for certain embodiments it may be advantageous to incorporate at least some portion of the states and/or the state properties associated with a data entity into the data entity itself. That is, the file or other construct that is the data entity includes therein the data that makes up the states for that data entity.

However, for other embodiments it may be advantageous if some or all of the states and/or the state properties are distinct and/or separate from the data entity. For example, the data entity might include pointers to a file or database wherein the states are stored.

Other approaches may be equally suitable.

Figure 8:
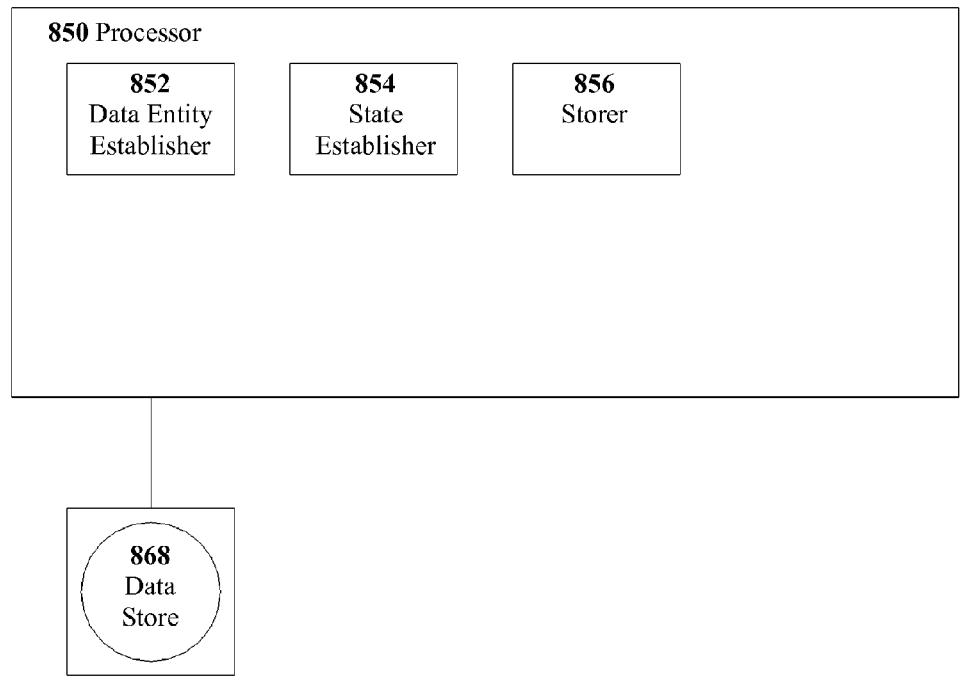
FIG. 8 shows a functional diagram of an example embodiment of an apparatus for associating content for an entity according to the present invention.

Moving on now to FIG. 8, therein is shown a functional diagram of an example apparatus for associating content for an entity according to the present invention.

The example apparatus of FIG. 8 includes a processor 850 adapted to execute executable instructions. The invention is not particularly limited with regard to the choice of processor 850. Suitable data processors 850 include but are not limited to digital electronic microprocessors. Although the processor 850 is referred to herein for clarity as though it were a singular and self-contained physical device, this is not required, and other arrangements may be suitable. For example, the processor 850 may constitute a processing capability in a network, without a well-defined physical form.

The apparatus also includes several functional assemblies of executable instructions 852, 854, and 856 instantiated on the processor 850. The functional assemblies of executable instructions 852, 854, and 856 include a data entity establisher 852, a state establisher 854, and a storer 856.

For convenience, these functional assemblies of executable instructions 852, 854, and 856 may be referred to as programs; however, the functional assemblies of executable instructions 852, 854, and 856 are not necessarily integrated programs, nor necessarily distinct from one another. That is to say, some or all of the functional assemblies of executable instructions 852, 854, and 856 may be composed of multiple elements rather than being single integrated programs, and/or some or all may be parts of a single multi-function program rather than being distinct individual programs. The present invention is not particularly limited with regard to how the functional assemblies of executable instructions 852, 854, and 856 are arranged, assembled, configured, instantiated, etc. except as described herein. These comments should also be understood to apply to other functional assemblies of executable instructions as described below.

The apparatus as shown in FIG. 8 also includes a data store 868 in communication with the processor 850. Suitable data stores 868 include but are not limited to magnetic hard drives, optical drives, and solid state memory devices. The present invention is not particularly limited with regard to the type of data store 868. Moreover, although the data store 868 is referred to herein for clarity as though it were a self-contained physical device, this is not required, and the use of non-discrete and/or non-physical data storage such as cloud storage as a data store 868 may be equally suitable. Furthermore, the data store 868 is not required to be a dedicated data storage device; data storage within the processor 850, data storage within some other processor or other device, etc. may be equally suitable. Also, although for convenience the data store 868 is shown proximate the processor 850, in some embodiments the data store 868 may be a separate device, and/or may be located at some considerable distance from the processor. Thus in practice, the data store may include (but is not required to include) communication hardware, i.e. for communicating between the processor and some relatively distant location wherein data may be stored (e.g. using wifi or other wireless communication, wired communication, etc.).

With regard to functions of the functional assemblies of executable instructions 852, 854, and 856, the data entity establisher 852 is adapted to establish one or more data entities, those data entities being augmented reality entities and/or virtual reality entities as described previously herein (e.g. with respect to FIG. 1).

The state establisher 854 is adapted to establish one or more states for one or more data entities, states also having been described previously herein (e.g. with respect to FIG. 1). The state establisher 854 is more particularly adapted to establish a state time and a plurality of state properties that at least correspond substantially to properties of the relevant data entities. As noted previously, the state properties may for certain embodiments be identical to the properties of the data entity (e.g. digital copies thereof), but this is not required.

The storer 856 is adapted to store data entities and states therefor in the data store 868 in such manner as to enable output of the data entity exhibiting at least one state property as of a corresponding state time, at a time other than the state time. That is, the storer 856 stores such information in the data store 868 so as to permit later output thereof (e.g. to a virtual reality environment and/or an augmented reality environment).

Figure 9:
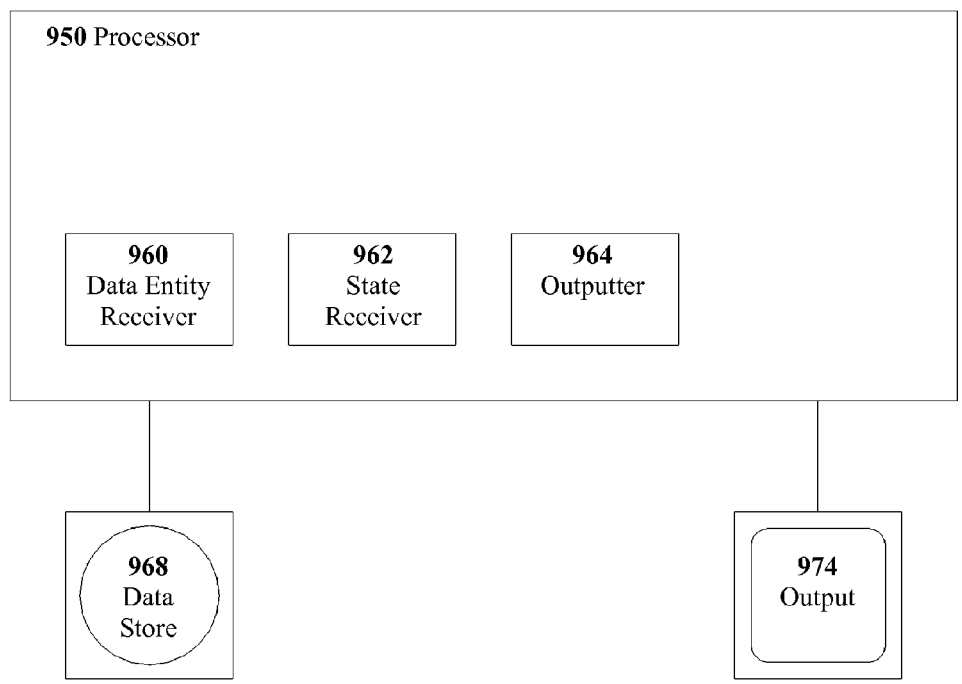
FIG. 9 shows a functional diagram of an example embodiment of an apparatus for outputting associated content for an entity according to the present invention.

Turning to FIG. 9, therein is shown a functional diagram of an example embodiment of an apparatus for outputting associated content for an entity according to the present invention.

The example apparatus of FIG. 9 includes a processor 950 adapted to execute executable instructions. As noted with regard to FIG. 8, the invention is not particularly limited with regard to the choice of processor 950. Suitable data processors 950 include but are not limited to digital electronic microprocessors. Although the processor 950 is referred to herein for clarity as though it were a singular and self-contained physical device, this is not required, and other arrangements may be suitable. For example, the processor 950 may constitute a processing capability in a network, without a well-defined physical form.

The apparatus as shown in FIG. 9 also includes a data store 968 in communication with the processor 950. Suitable data stores 968 include but are not limited to magnetic hard drives, optical drives, and solid state memory devices. The present invention is not particularly limited with regard to the type of data store 968. Moreover, although the data store 968 is referred to herein for clarity as though it were a self-contained physical device, this is not required, and the use of non-discrete and/or non-physical data storage such as cloud storage as a data store 968 may be equally suitable. Furthermore, the data store 968 is not required to be a dedicated data storage device; data storage within the processor 950, data storage within some other processor or other device, etc. may be equally suitable. Also, although for convenience the data store 968 is shown proximate the processor 950, in some embodiments the data store 968 may be a separate device, and/or may be located at some considerable distance from the processor. Thus in practice, the data store may include (but is not required to include) communication hardware, i.e. for communicating between the processor and some relatively distant location wherein data may be stored (e.g. using wifi, wired communication, etc.).

It is noted that the processor 950 and data store 968 of FIG. 9, adapted for outputting associated content for an entity according to the present invention, may be for at least some embodiments be substantially similar or identical to the processor 850 and data store 868 of FIG. 8, adapted for associating content for an entity according to the present invention. Indeed, as shown in subsequent figures certain processors and data stores may support both aspects of the present invention. However, such similarities are examples only, and are not required.

Returning to FIG. 9, the apparatus further includes an output 974 adapted to output a data entity, e.g. to a virtual reality environment and/or an augmented reality environment. The present invention is not particularly limited with regard to the output 974. A wide range of outputs, suitable of outputting a wide range of sensory and/or other information, may be suitable. For example, video and/or graphical outputs may include but are not limited to light emitting diode displays (LED), organic light emitting diode displays (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a viewer's eyes also may be equally suitable. Either digital or analog display technologies may be suitable. In particular, stereo systems adapted to output stereo data so as to present the appearance of a three dimensional environment to a user may be suitable. Other outputs, including but not limited to audio outputs, tactile and/or haptic outputs, olfactory outputs, etc. may also be suitable. Substantially any construct that can convey data may be suitable.

The apparatus of FIG. 9 also includes several functional assemblies of executable instructions 960, 962, and 964 instantiated on the processor 950. The functional assemblies of executable instructions 960, 962, and 964 include a data entity receiver 960, a state receiver 962, and an outputter 964.

The data entity receiver 960 is adapted to receive data entities from the data store 968, those data entities being augmented reality entities and/or virtual reality entities as described previously herein (e.g. with respect to FIG. 1). It is noted that, as previously described, the data store 968 may vary considerably, thus the function of receiving the data entity may encompass reading data from a hard drive, accepting data from a remote source, intaking data from an input device, etc.

The state receiver 962 is adapted to receive states associated with a data entity, those states including a state time and a plurality of state properties, with at least one of the state properties including a spatial arrangement of the data entity.

The outputter 964 is adapted for outputting the data entity to a virtual reality environment and/or an augmented reality environment via the output 974 at an output time that is substantially different from the state time, with the data entity exhibiting at least one of the state properties associated with the state time.

Figure 10:
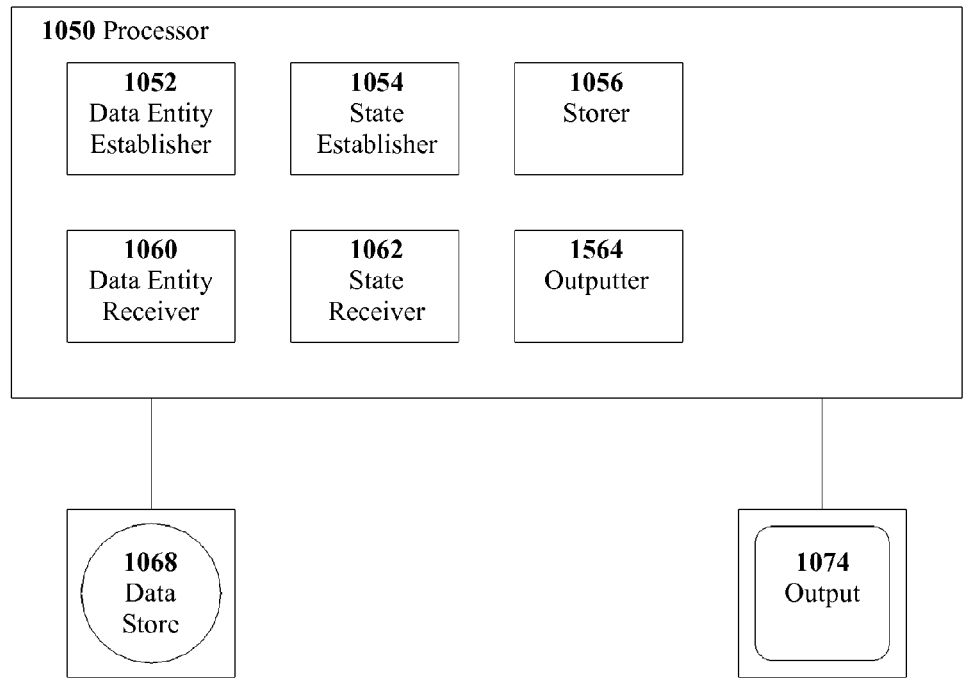
FIG. 10 shows a functional diagram of an example embodiment of an apparatus for associating content for an entity and outputting associated content for the entity according to the present invention.

With reference now to FIG. 10, a functional diagram of an example embodiment of an apparatus for associating content for an entity and outputting associated content for the entity according to the present invention is shown therein. As may be understood from an examination of FIG. 10 in comparison with FIG. 8 and FIG. 9, the example apparatus shown in FIG. 10 combines the functions as described individually for FIG. 8 and FIG. 9.

The example apparatus of FIG. 10 includes a processor 1050 adapted to execute executable instructions. The apparatus also includes a data store 1068 in communication with the processor 1050, and an output 1974 in communication with the processor 1050.

The apparatus includes several functional assemblies of executable instructions 1052, 1054, 1056, 1060, 1062, and 1064 instantiated on the processor 1050. The functional assemblies of executable instructions 1052, 1054, 1056, 1060, 1062, and 1064 include a data entity establisher 1052, a state establisher 1054, a storer 1056, a data entity receiver 1060, a state receiver 1062, and an outputter 1064.

The data entity establisher 1052 is adapted to establish one or more data entities, those data entities being augmented reality entities and/or virtual reality entities as described previously herein (e.g. with respect to FIG. 1).

The state establisher 1054 is adapted to establish one or more states for one or more data entities, states also having been described previously herein (e.g. with respect to FIG. 1). The state establisher 1054 is more particularly adapted to establish a state time and a plurality of state properties that at least correspond substantially to properties of the relevant data entities.

The storer 1056 is adapted to store data entities and states therefor in the data store 1068 in such manner as to enable output of the data entity exhibiting at least one state property as of a corresponding state time, at a time other than the state time.

The data entity receiver 1060 is adapted to receive data entities from the data store 1068, those data entities being augmented reality entities and/or virtual reality entities as described previously herein (e.g. with respect to FIG. 1).

The state receiver 1062 is adapted to receive states associated with a data entity, those states including a state time and a plurality of state properties, with at least one of the state properties including a spatial arrangement of the data entity.

The outputter 1064 is adapted for outputting the data entity to a virtual reality environment and/or an augmented reality environment via the output 1074 at an output time that is substantially different from the state time, with the data entity exhibiting at least one of the state properties associated with the state time.

Where the arrangement shown in FIG. 8 enables association of content, and the arrangement shown in FIG. 9, enables output of content making use of such association, the arrangement of FIG. 10 enables both functions. While for at least some embodiments it may be useful for a single apparatus to provide both such functions, for other embodiments it may be equally suitable for an apparatus to support only one or the other (as shown in FIG. 8 and FIG. 9).

Figure 11:
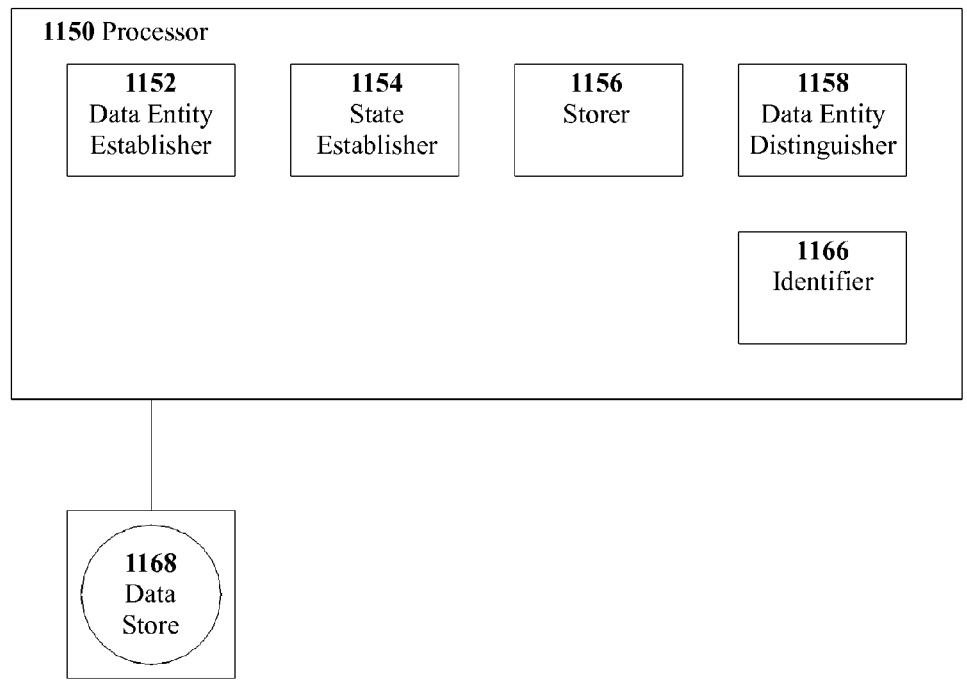
FIG. 11 shows a functional diagram of an example embodiment of an apparatus for associating content for an entity according to the present invention, with capabilities for distinguishing and identifying content.

Turning now to FIG. 11, a functional diagram of an example embodiment of an apparatus for associating content for an entity according to the present invention, with capabilities for distinguishing and identifying content is shown therein.

The example apparatus of FIG. 11 includes a processor 1150 adapted to execute executable instructions. The apparatus also includes a data store 1168 in communication with the processor 1150. The apparatus also includes several functional assemblies of executable instructions, specifically a data entity establisher 1152, a state establisher 1154, and a storer 1156 similar to those previously described herein.

In addition, the apparatus includes two further functional assemblies of executable instructions 1158 and 1166, identified individually as a data entity distinguisher 1158 and an identifier 1166.

The data entity distinguisher 1158 is adapted for distinguishing a data entity from a larger body of information. This may be understood in considering, for example, an image of a physical object in front of a real-world background. Such an object might become the parent entity for establishing a data entity. However, in order to establish a data entity from such an image it may be necessary to determine what part of the image (and/or the data therein) represents the object, and what represents the background. (Conversely, the background also might be established as a data entity, but it may still be necessary to distinguish the background from foreground objects in such a case.) The data entity distinguisher 1158 partitions available data, so as to facilitate establishing one or more data entities therefrom.

In at least some embodiments a data entity distinguisher 1158 may be integrated with a data entity establisher 1152, as the functions thereof are at least somewhat related: a data entity distinguisher 1158 determines what may be established as a data entity, and the data entity establisher 1152 then establishes a data entity therefrom.

It is emphasized that consideration of an image of a physical-world environment is an example only. For at least some embodiments, distinguishing what parent objects may be used to establish data entities, and/or distinguishing existing data entities as such within complex and/or changing environments, may also fall under the purview of a data entity distinguisher 1158.

The present invention is not particularly limited with regard to what a data entity distinguisher 1158 may consider, or how a data entity distinguisher may be implemented. For example, in an apparatus utilizing stereo image sensors to collect data regarding an environment a data entity distinguisher 1158 might distinguish parent entities and/or data entities from surrounding data by evaluating the distance to various points, and determining whether targets are at different distances. However, this is an example only. Other approaches for executing similar distance-based distinctions—for example, using distance sensors utilizing structured light, time of flight, etc.—may be equally suitable. Likewise, approaches unrelated to distance may be equally suitable.

The identifier 1166 is adapted to identify parent entities, data entities, and/or state properties therefor. For example, for an embodiment wherein the identifier 1166 is adapted to identify parent entities and/or data entities, the identifier 1166 may incorporate object identification capabilities, so as to be able to determine whether a parent entity is e.g. a car, a person, an apple, etc., and/or whether a data entity represents a car, a person, an apple, etc. For an embodiment wherein the identifier 1166 is adapted to identify state properties, the identifier 1166 may incorporate features for identifying (for an example data entity representing a person) whether a person is running, standing, sitting, etc. Thus, typically although not necessarily, an identifier 1166 will incorporate therein executable instructions adapted for object identification, feature identification, and/or activity identification. The present invention is not particularly limited with regard to approaches for object identification, feature identification, and/or activity identification, or with regard to the approaches or implementations for an identifier 1166 overall.

Figure 12:
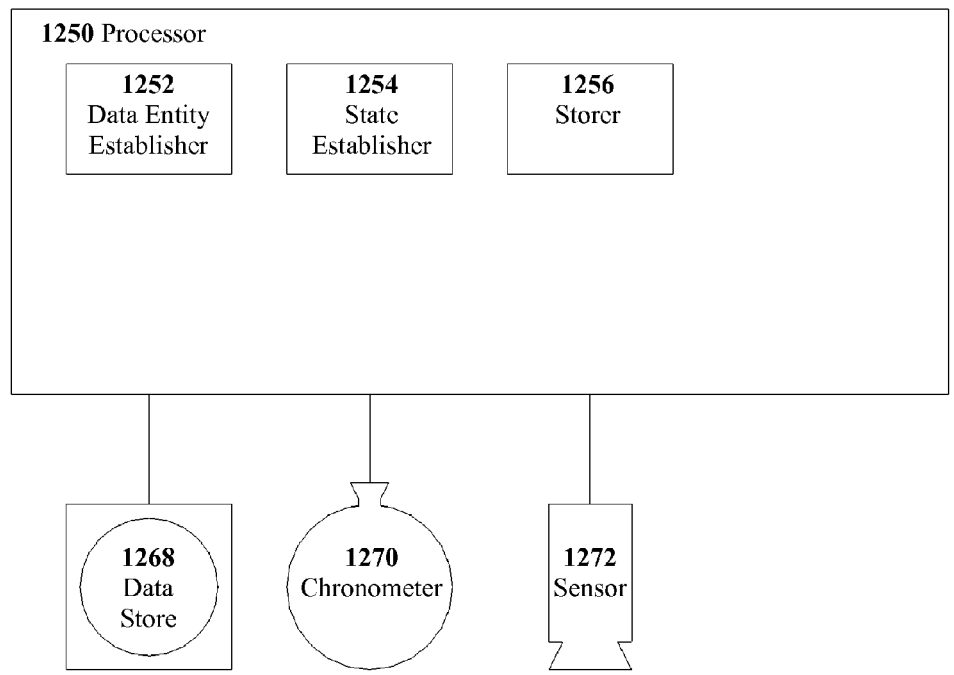
FIG. 12 shows a functional diagram of an example embodiment of an apparatus for associating content for an entity according to the present invention, with a chronometer and sensor.

Turning now to FIG. 12, therein is shown a functional diagram of an example embodiment of an apparatus for associating content for an entity according to the present invention, with a chronometer and sensor.

The example apparatus of FIG. 12 includes a processor 1250 adapted to execute executable instructions. The apparatus also includes a data store 1268 in communication with the processor 1250. The apparatus also includes several functional assemblies of executable instructions, specifically a data entity establisher 1252, a state establisher 1254, and a storer 1256 similar to those previously described herein.

In addition, the apparatus includes a chronometer 1270 and a sensor 1272.

As previously noted, in establishing a state associated with a data entity, a state time is to be established. The chronometer 1270 is adapted to establish a state time. Although shown as a distinct element, it is noted that for at least some embodiments the chronometer 1270 may be integrated into the processor 1250, or into some other element of or in communication with the apparatus. Also, other arrangements for establishing a state time than recording data from a chronometer may be equally suitable.

Also as previously noted, in establishing a state associated with a data entity, a plurality of state properties are to be established, including a state spatial arrangement. The sensor 1272 is adapted to establish state properties, and/or to acquire data to support establishing state properties. It will be understood that the nature of a particular sensor 1272 may depend to at least some degree on the specific state property or state properties to be established (or supported, etc.) therewith. For example, an imager might collect image data, color data, certain types of spatial arrangement data, etc. In addition, an imager (or other sensor) might determine a position of the apparatus at the state time, so as to facilitate determination of relative position of the data entity and/or other information.

Sensors suitable for determining spatial arrangement may include but are not limited to an accelerometer, a gyroscope, an imager, a stereo pair of imagers, a GPS sensor, a magnetometer, a structured light sensor, a time-of-flight sensor, an ultrasonic sensor, and/or a wireless signal triangulation sensor (including but not limited to a wifi positioning sensor).

Other useful sensors may include but are not limited to a bar code reader, a chemical sensor, an electrical sensor, an electrical field sensor, a gas detector, a humidity sensor, an imager, a stereo pair of imagers, a light sensor, a magnetic field sensor, a microphone, a motion sensor, a pressure sensor, a radar sensor, a radiation sensor, an RFID sensor, a smoke sensor, a spectrometer, a thermal sensor, an ultrasonic sensor, and/or a vibration sensor.

Other arrangements, other sensors, and/or multiple sensors may also be equally suitable.

Figure 13:
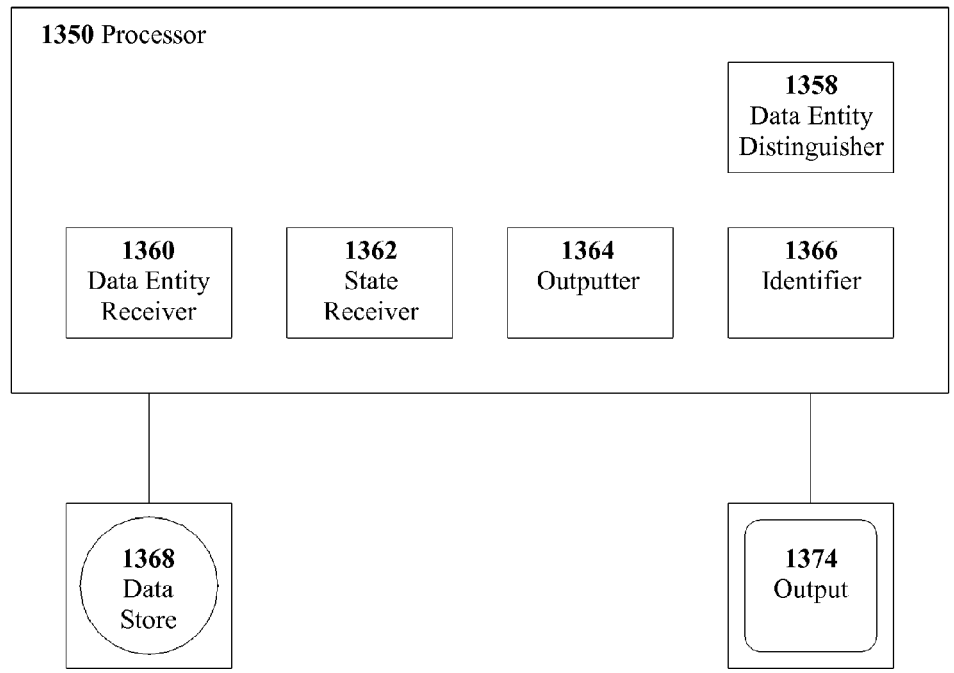
FIG. 13 shows a functional diagram of an example embodiment of an apparatus for outputting associated content for an entity according to the present invention, with capabilities for distinguishing and identifying content.

With regard now to FIG. 13, therein is shown a functional diagram of an example embodiment of an apparatus for outputting associated content for an entity according to the present invention, with capabilities for distinguishing and identifying content.

The example apparatus of FIG. 13 includes a processor 1350 adapted to execute executable instructions. The apparatus also includes a data store 1368 in communication with the processor 1350, and an output 1374 in communication with the processor 1350. The apparatus also includes several functional assemblies of executable instructions, specifically a data entity receiver 1360, a state receiver 1362, and an outputter 1364 similar to those previously described herein.

In addition, the apparatus includes two further functional assemblies of executable instructions 1358 and 1366, identified individually as a data entity distinguisher 1358 and an identifier 1366. The data entity distinguisher 1358 and the identifier 1366 may be at least somewhat similar to corresponding elements described with regard to FIG. 11. However, as may be seen from FIG. 13, at least some portion of distinguishing data entities and/or some portion of identifying data entities, parent entities, and/or state properties may be executed in conjunction with output of the data entities, in addition to and/or in place of being executed in conjunction with establishing the data entities. For example, entities not identified when originally established might be identified when being outputted.

Figure 14:
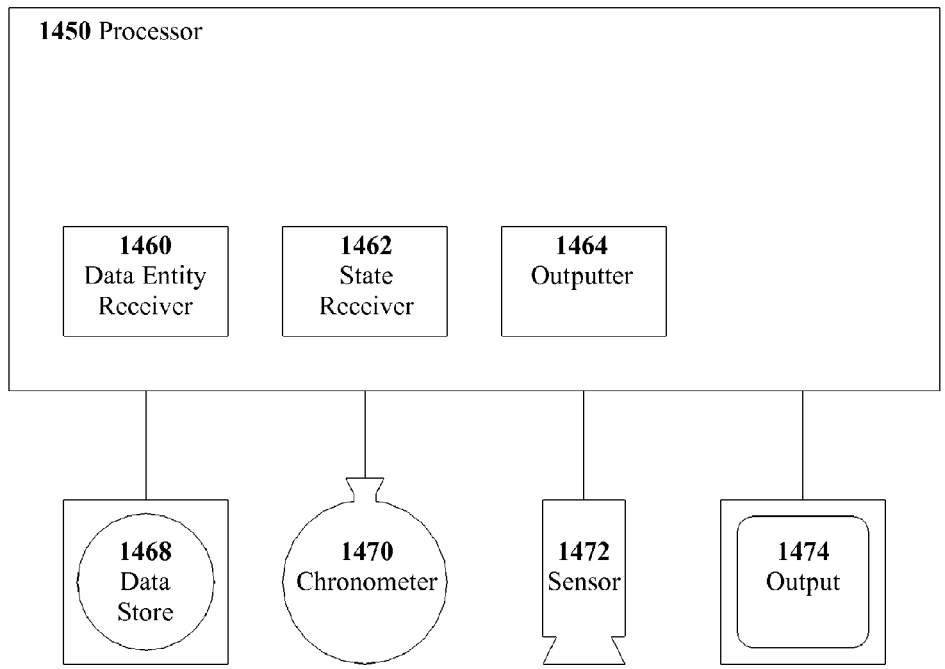
FIG. 14. shows a functional diagram of an example embodiment of an apparatus for outputting associated content for an entity according to the present invention, with a chronometer and sensor.

Now with regard to FIG. 14, a functional diagram of an example embodiment of an apparatus for outputting associated content for an entity according to the present invention, with a chronometer and sensor is shown therein.

The example apparatus of FIG. 14 includes a processor 1450 adapted to execute executable instructions. The apparatus also includes a data store 1468 in communication with the processor 1450, and an output 1474 in communication with the processor 1450. The apparatus also includes several functional assemblies of executable instructions, specifically a data entity receiver 1460, a state receiver 1462, and an outputter 1464 similar to those previously described herein.

In addition, the apparatus includes a chronometer 1470 and a sensor 1472.

As previously noted, outputs are executed at output times, and moreover (for instances including but not limited to arrangements outputting multiple iterations of a data entity with different states) may be executed at multiple output times, those output times potentially having some particular relationship therebetween. The chronometer 1470 is adapted to provide data for managing output at output times. Although shown as a distinct element, for at least some embodiments the chronometer 1470 may be integrated into the processor 1450, or into some other element of or in communication with the apparatus. Also, other arrangements for addressing output times may be equally suitable.

Also as previously noted, in outputting a data entity it may be necessary and/or useful to dispose such a data entity with some specific relationship to at least some state properties thereof, whether that relationship is the same as at the state time or different therefrom. For example, outputting a data entity with either the same spatial arrangement as at a state time or with a different spatial arrangement than that data entity had at the state time may require or at least benefit from an ability to sense current surroundings. Put more simply, in order position an output, it may be useful or necessary to sense position. The sensor 1472 is adapted to coordinate output in accordance with such needs and/or uses. For example, an imager might be used to collect spatial arrangement data so as to facilitate suitable re-positioning and/or re-orienting of a data entity as compared with the spatial arrangement of that data entity at the state time (whether with the same spatial arrangement or a different spatial arrangement). Likewise, an imager might be used to determine a position of the apparatus at the output time, so as to facilitate output with proper spatial arrangement.

Sensors suitable for determining spatial arrangement may include but are not limited to an accelerometer, a gyroscope, an imager, a stereo pair of imagers, a GPS sensor, a magnetometer, a structured light sensor, a time-of-flight sensor, an ultrasonic sensor, and/or a wireless signal triangulation sensor (including but not limited to a wifi positioning sensor).

Other useful sensors may include but are not limited to a bar code reader, a chemical sensor, an electrical sensor, an electrical field sensor, a gas detector, a humidity sensor, an imager, a stereo pair of imagers, a light sensor, a magnetic field sensor, a microphone, a motion sensor, a pressure sensor, a radar sensor, a radiation sensor, an RFID sensor, a smoke sensor, a spectrometer, a thermal sensor, an ultrasonic sensor, and/or a vibration sensor.

Other arrangements, other sensors, and/or multiple sensors may also be equally suitable.

Figure 15:
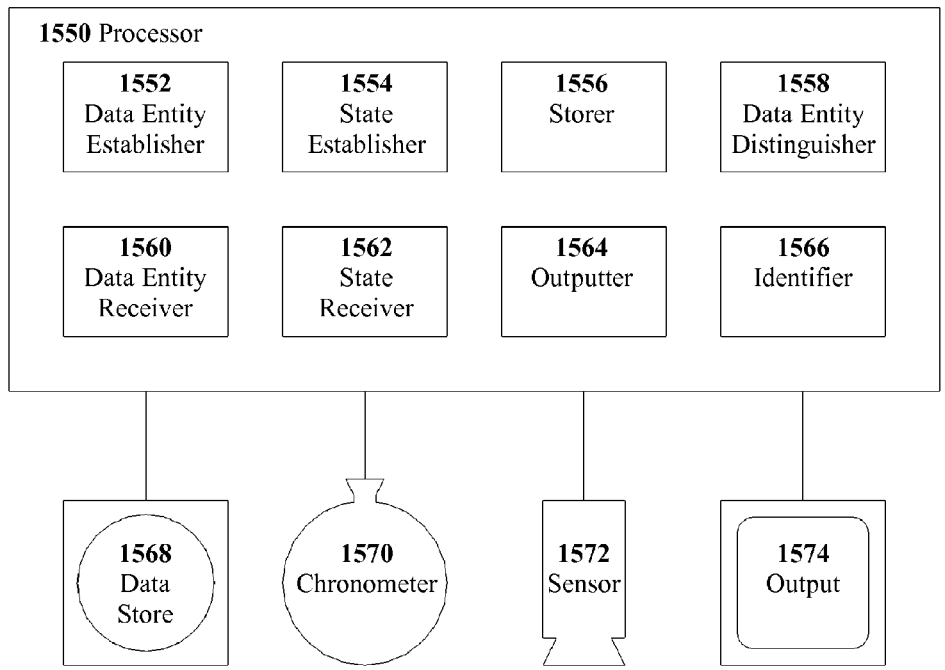
FIG. 15 shows a functional diagram of an example embodiment of an apparatus for associating content for an entity and outputting associated content for the entity according to the present invention, with capabilities for distinguishing and identifying content, and with a chronometer and sensor.

Turning to FIG. 15, therein is shown a functional diagram of an example embodiment of an apparatus for associating content for an entity and outputting associated content for the entity according to the present invention, with capabilities for distinguishing and identifying content, and with a chronometer and sensor.

The example apparatus of FIG. 15 includes a processor 1550 adapted to execute executable instructions. The apparatus also includes a data store 1568 in communication with the processor 1550, and an output 1574 in communication with the processor 1550. The apparatus also includes several functional assemblies of executable instructions, specifically a data entity establisher 1552, a state establisher 1554, a storer 1556, a data entity receiver 1560, a state receiver 1562, and an outputter 1564 similar to those previously described herein.

The apparatus likewise includes two further functional assemblies of executable instructions 1558 and 1566, identified individually as a data entity distinguisher 1558 and an identifier 1566, also similar to those previously described herein.

The apparatus further includes a chronometer 1570 and a sensor 1572, again similar to those previously described herein.

Functions and interrelationships of similar elements have been described herein individually. As may be seen, all such functions may be combined in one apparatus, for example such as the apparatus shown in FIG. 15. While not all functions described herein, or elements facilitating said functions, necessarily will be or must be incorporated into all embodiments of the present invention, any or all such functions and/or elements may be incorporated into individual embodiments. Furthermore, additional elements and/or functions may be incorporated into an apparatus according to the present invention.

Figure 16:
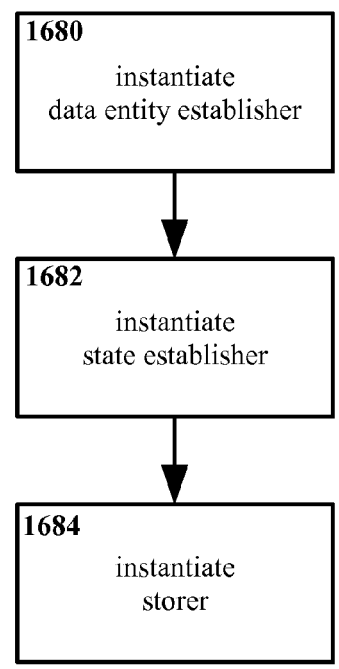
FIG. 16 shows an example method for establishing capabilities for associating content for an entity according to the present invention onto a processor.

Turning to FIG. 16, therein is shown an example method for establishing capabilities for associating content for an entity according to the present invention onto a processor. In the example method of FIG. 16, a data entity establisher is instantiated 1680 on a processor. Data entity establishers have already been described herein with regard to the present invention, for example with respect to FIG. 8. The present invention is not particularly limited with regard to the manner by which the data entity establisher is instantiated 1680 (nor are other instantiation steps particularly limited with regard to manner). For certain embodiments, the data entity establisher might be instantiated 1680 on a processor as a program, being loaded from a data store such as a hard drive or solid state drive, loading being executed and/or monitored for example through an operating system. However, other arrangements may be equally suitable.

Moving on in FIG. 16. a state establisher is instantiated 1682 onto the processor. State establishers have already been described herein with regard to the present invention, for example with respect to FIG. 8.

A storer also is instantiated 1684 onto the processor. Storers also have already been described herein with regard to the present invention, for example with respect to FIG. 8.

With the data entity establisher, state establisher, and storer instantiated 1680, 1682, and 1684, the capabilities necessary to carry out a method for associating content for an entity according to the present invention, and/or to function as an apparatus for associating content for an entity according to the present invention, are in place.

Figure 17:
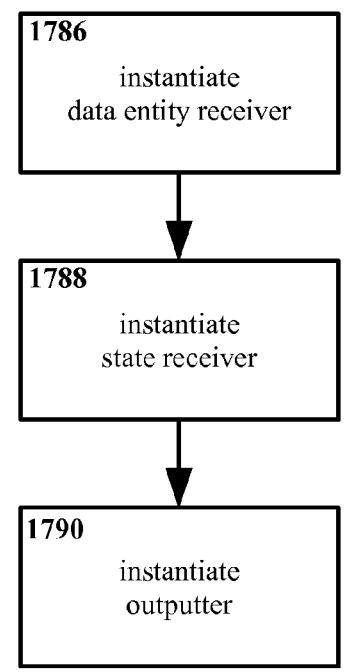
FIG. 17 shows an example method for establishing capabilities for outputting associated content for an entity according to the present invention onto a processor.

Turning to FIG. 17, an example method for establishing capabilities for outputting associated content for an entity according to the present invention onto a processor is shown therein. A data entity receiver is instantiated 1786 onto a processor. Data entity receivers have already been described herein with regard to the present invention, for example with respect to FIG. 9.

A state receiver also is instantiated 1788 onto the processor, and an outputter further is instantiated 1790 onto the processor. State receivers and outputters have already been described herein with regard to the present invention, again for example with respect to FIG. 9.

With the data entity receiver, state receiver, and outputter instantiated 1786, 1788, and 1790, the capabilities necessary to carry out a method for outputting associated content for an entity according to the present invention, and/or to function as an apparatus for outputting associated content for an entity according to the present invention, are in place.

Figure 18:
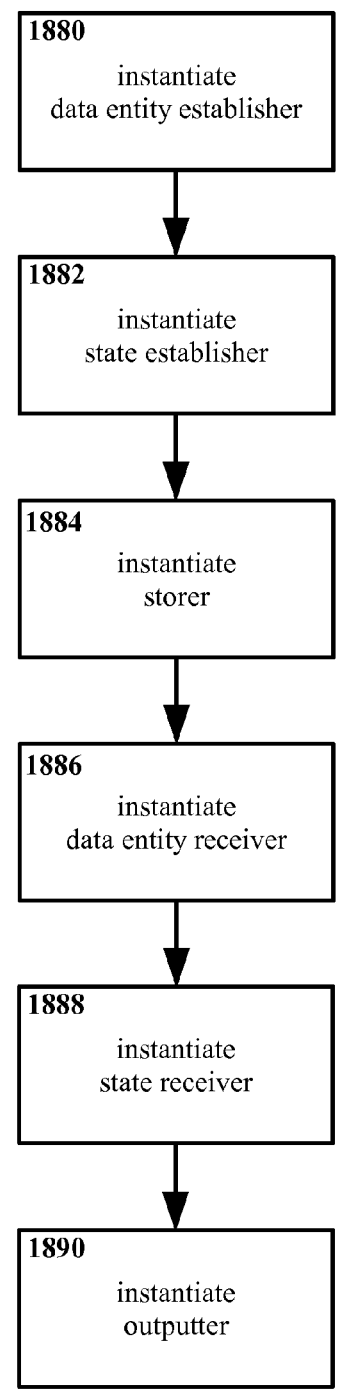
FIG. 18 shows an example method for establishing capabilities for associating content for an entity and outputting the associated content for the entity according to the present invention onto a processor.

Now with reference to FIG. 18, an example method for establishing capabilities for associating content for an entity and outputting the associated content for the entity according to the present invention onto a processor is shown therein.

In the example method of FIG. 18, a data entity establisher is instantiated 1880 on a processor. A state establisher is instantiated 1882 onto the processor. A storer also is instantiated 1684 onto the processor.

Moving on in FIG. 18, a data entity receiver is instantiated 1886 onto the processor. A state receiver also is instantiated 1888 onto the processor, and an outputter further is instantiated 1890 onto the processor.

With the data entity establisher, state establisher, storer, data entity receiver, state receiver, and outputter instantiated

1880, 1882, 1884, 1886, 1888, and 1890, the capabilities necessary to carry out a method for associating content and outputting associated content for an entity according to the present invention, and/or to function as an apparatus for associating content and outputting associated content for an entity according to the present invention, are in place.

Figure 19:
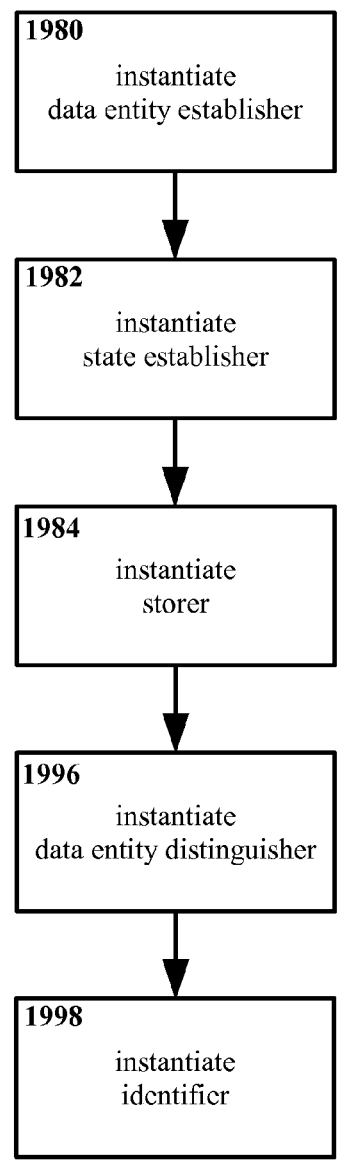
FIG. 19 shows an example method for establishing capabilities for associating content for an entity according to the present invention onto a processor, along with capabilities for distinguishing and identifying content.

Turning now to FIG. 19, an example method for establishing capabilities for associating content for an entity according to the present invention onto a processor, along with capabilities for distinguishing and identifying content is shown therein.

Similarly to the arrangement in FIG. 16, in FIG. 19 a data entity establisher is instantiated 1980 on a processor. A state establisher is instantiated 1982 onto the processor. A storer also is instantiated 1984 onto the processor.

In addition, a data entity distinguisher is instantiated 1996 onto the processor. Data entity distinguishers have already been described herein with regard to the present invention, for example with respect to FIG. 11. An identifier also is instantiated 1998 onto the processor. Identifiers also have already been described herein with regard to the present invention, for example with respect to FIG. 11.

With the data entity establisher, state establisher, and storer instantiated 1980, 1982, and 1984, the capabilities necessary to carry out a method for associating content for an entity according to the present invention, and/or to function as an apparatus for associating content for an entity according to the present invention, are in place. Furthermore, with the data entity distinguisher and the identifier instantiated 1996 and 1998, the capabilities necessary to distinguish data entities and to identify data entities, parent entities, and/or state properties according to the present invention also are in place.

Figure 20:
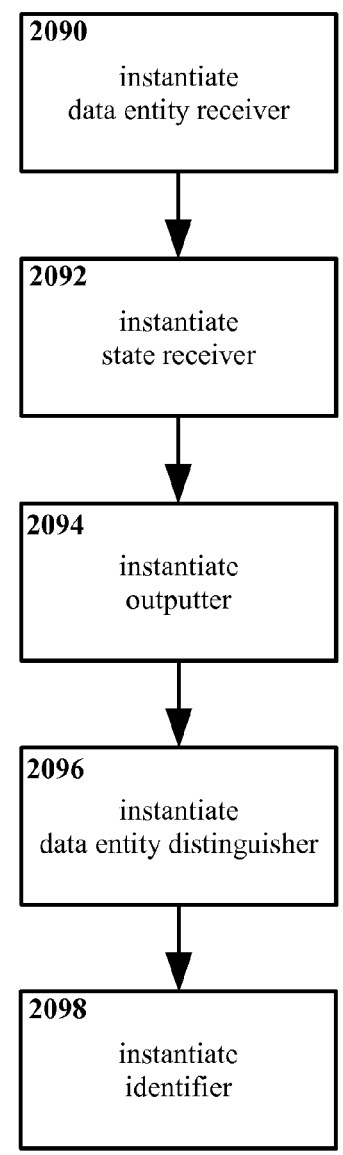
FIG. 20 shows an example method for establishing capabilities for outputting associated content for an entity according to the present invention onto a processor, along with capabilities for distinguishing and identifying content.

Turning now to FIG. 20, therein is shown an example method for establishing capabilities for outputting associated content for an entity according to the present invention onto a processor, along with capabilities for distinguishing and identifying content. Similarly to the arrangement in FIG. 17, in FIG. 20 a data entity receiver is instantiated 2090 on a processor. A state receiver is instantiated 2092 onto the processor. An outputter also is instantiated 2094 onto the processor.

In addition, a data entity distinguisher is instantiated 2096 onto the processor. An identifier also is instantiated 2098 onto the processor.

With the data entity receiver, state receiver, and outputter instantiated 2090, 2092, and 2094, the capabilities necessary to carry out a method for outputting associated content for an entity according to the present invention, and/or to function as an apparatus for outputting associated content for an entity according to the present invention, are in place. Furthermore, with the data entity distinguisher and the identifier instantiated 2096 and 2098, the capabilities necessary to distinguish data entities and to identify data entities, parent entities, and/or state properties according to the present invention also are in place.

Figure 21:
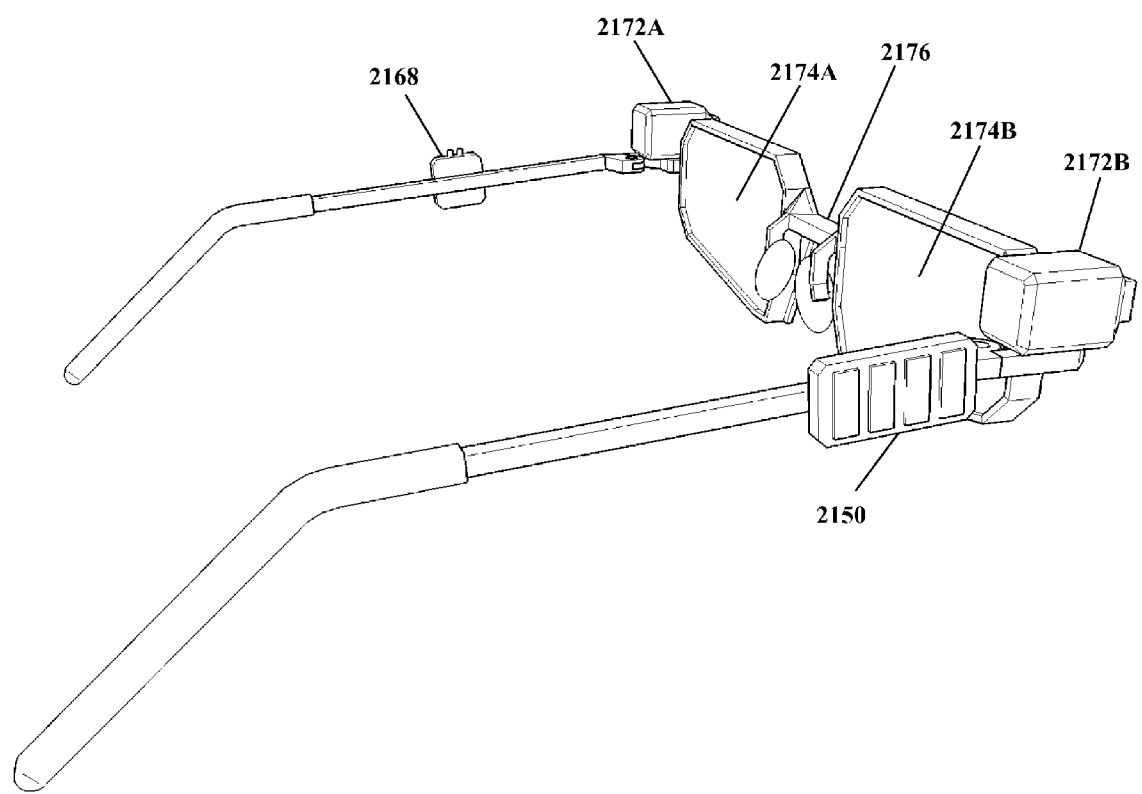
FIG. 21 shows a perspective view of an example embodiment of an apparatus for associating content for an entity and/or outputting associated content for the entity according to the present invention.

Now with respect to FIG. 21, therein is shown a perspective view of an example embodiment of an apparatus for associating content for an entity and/or outputting associated content for the entity according to the present invention. An apparatus according to the present invention may take many forms, and/or may be incorporated into many devices. Similarly, a method according to the present invention may be executed on many devices in many forms. The arrangement of FIG. 21 shows one example of such a form, however, the present invention is not limited only to such a form.

In the apparatus of FIG. 21, a processor 2150 is present therein. Although not visible in a perspective view, a data entity establisher, a state establisher, a storer, a data entity receiver, a state receiver, an outputter, a data entity distinguisher, and/or an identifier (in combinations depending on the particulars of a given embodiment) may be considered to be disposed on the processor 2150.

The apparatus also includes a data store 2168. Further, the apparatus includes first and second sensors 2172A and 2172B, illustrated as imagers in a stereo configuration, though such an arrangement is an example only and other arrangements may be equally suitable. In addition, the apparatus includes first and second outputs 2174A and 2174B, illustrated as display screens in a stereo configuration, though such an arrangement is an example only and other arrangements may be equally suitable. No chronometer is shown, though as previously noted a chronometer may for at least some embodiments be incorporated into the processor 2150.

In addition, the apparatus shown in FIG. 21 includes a body 2176, illustrated in the form of a frame for a head mounted display, resembling a pair of glasses. Given such a body 2176, and the arrangement shown, the sensors 2172A and 2172B are disposed so as to view substantially forward, i.e. substantially along the line of sight of a person wearing the apparatus. Depending on the particulars of the sensors 2172A and 2172B, the sensors 2172A and 2172B may provide fields of view substantially similar to the fields of view of a person wearing the apparatus. Furthermore, the body 2176 is configured such that if the body 2176 is worn, the outputs 2174A and 2174B will be disposed proximate to and substantially aligned with the wearer's eyes. Such an arrangement may be useful for at least certain embodiments of the present invention. However such an arrangement is an example only, and other arrangements may be equally suitable.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. An apparatus, comprising:
   a processor adapted to execute executable instructions;
   a data entity establisher instantiated on said processor, said data entity establisher comprising executable instructions adapted for establishing a plurality of distinct data entities, each said distinct data entity comprising at least one of a group consisting of an augmented reality entity and a virtual reality entity;
   a state establisher instantiated on said processor, said state establisher comprising executable instructions adapted for establishing a plurality of distinct states for each said data entity, each said state comprising:
   a state time;
   a plurality of state properties at least substantially corresponding to properties of one said data entity substantially at said state time, said plurality of state properties comprising a state spatial arrangement of said data entity;
   a data store in communication with said processor;
   a storer instantiated on said processor, said storer comprising executable instructions adapted for storing in said data store said plurality of distinct data entities and said distinct states therefor, so as to enable output of said distinct data entities to at least one of an augmented reality environment and a virtual reality environment with each said data entity exhibiting at least a portion of one of said distinct states therefor;
a user output in communication with said processor;
wherein:
said data entity establisher and said state establisher are adapted to cooperate to establish:
   a first data entity with a first state and a second state, a first state time of said first state being substantially different from a second state time of said second state; and
   said first data entity with said first state, and a second data entity with a third state, said first state time of said first state being substantially different from a third state time of said third state;
said storer is adapted to store for substantially concurrent output at a same output time:
   a first iteration of said first data entity exhibiting said first state and a second iteration of said first data entity exhibiting said second state, said output time being substantially different from said first and second state times; and
   said first iteration of said first data entity exhibiting said first state and a first iteration of said second data entity exhibiting said third state, said output time being substantially different from said first and third state times;
said user output is adapted to output at said same output time so as to be sensed by a user:
   said first iteration of said first data entity exhibiting said first state and said second iteration of said first data entity exhibiting said second state; and
   said first iteration of said first data entity exhibiting said first state and said first iteration of said second data entity exhibiting said third state.

2. The apparatus of claim 1, comprising:
a chronometer adapted to determine said output time.

3. The apparatus of claim 1, comprising:
at least one sensor in communication with said processor.

4. The apparatus of claim 3, wherein:
said at least one sensor is adapted to determine at least one of a group consisting of a spatial arrangement of said apparatus at said state time, a spatial arrangement of said apparatus at said output time, and state spatial arrangement of said data entity.

5. The apparatus of claim 3, wherein:
said at least one sensor comprises at least one of a group consisting of an accelerometer, a gyroscope, an imager, a stereo pair of imagers, a GPS sensor, a magnetometer, a structured light sensor, a time-of-flight sensor, an ultrasonic sensor, and a wireless signal triangulation sensor.

6. The apparatus of claim 3, wherein:
said at least one sensor comprises at least one of a group consisting of a bar code reader, a chemical sensor, an electrical sensor, an electrical field sensor, a gas detector, a humidity sensor, an imager, a stereo pair of imagers, a light sensor, a magnetic field sensor, a microphone, a motion sensor, a pressure sensor, a radar sensor, a radiation sensor, an RFID sensor, a smoke sensor, a spectrometer, a thermal sensor, an ultrasonic sensor, and a vibration sensor.

7. The apparatus of claim 1, comprising:
a data entity distinguisher instantiated on said processor, said data entity distinguisher comprising executable instructions adapted for distinguishing said data entities from a surrounding thereof.

8. The apparatus of claim 1, comprising:
a data entity identifier instantiated on said processor, said data entity identifier comprising executable instructions adapted for identifying at least one of a group consisting of said data entities, parent entities for said data entities, and at least one of said state properties.

9. The apparatus of claim 1, wherein:
at least a portion of said apparatus is disposed on a head mounted display.

10. The apparatus of claim 1, comprising:
a data entity receiver instantiated on said processor, said data entity receiver comprising executable instructions adapted for receiving at least one of said data entities from said data store;
a state receiver instantiated on said processor, said state receiver comprising executable instructions adapted for receiving from said data store at least one said state for said at least one data entity;
an output in communication with said processor, said output being adapted to output said at least one data entity;
an outputter instantiated on said processor, said outputter comprising executable instructions adapted for outputting said plurality of data entities via said user output.

11. The apparatus of claim 1, wherein:
said states for said data entities are incorporated into said data entities.

12. An apparatus, comprising:
a processor adapted to execute executable instructions;
a data store in communication with said processor;
a data entity receiver instantiated on said processor, said data entity receiver comprising executable instructions adapted for receiving from said data store a plurality of distinct data entities, each said distinct data entity comprising at least one of a group consisting of an augmented reality entity and a virtual reality entity;
a state receiver instantiated on said processor, said state receiver comprising executable instructions adapted for receiving from said data store a plurality of distinct states for each said data entity, each said state comprising:
a state time;
a plurality of state properties at least substantially corresponding to properties of one said data entity substantially at said state time, said plurality of state properties comprising a state spatial arrangement of said data entity;
as a user output in communication with said processor;
an outputter instantiated on said processor, said outputter comprising executable instructions adapted for outputting said plurality of data entities via said user output to said at least one of said augmented reality environment and said virtual reality environment with each said data entity exhibiting at least a portion of one of said states therefor so as to be sensed by a user;
wherein:
   said data receiver and said state receiver are adapted to cooperate to establish:
      a first data entity with a first state and a second state, a first state time of said first state being substantially different from a second state time of said second state; and
      said first data entity with said first state, and a second data entity with a third state, said first state time of said first state being substantially different from a third state time of said third state;

said outputter is adapted to output via said user output at as a same output time:
   a first iteration of said first data entity exhibiting at least said portion of said first stat, and a second iteration of said first data entity exhibiting at least said portion of said second state, said output time being substantially different from said first and second state times; and
   said first iteration of said first data entity exhibiting at least said portion of said first state and a first iteration of said second data entity exhibiting at least said portion of said third stat, said output time being substantially different from said first and third state times.

13. The apparatus of claim 12, comprising:
a chronometer adapted to determine said output time.

14. The apparatus of claim 12, comprising:
at least one sensor in communication with said processor.

15. The apparatus of claim 14, wherein:
said at least one sensor is adapted to determine at least one of a group consisting of a spatial arrangement of said apparatus at at least one of said state times, a spatial arrangement of said apparatus at said at least one of said output times, and at least one of said state spatial arrangements of said data entity substantially corresponding with said at least one of said state times.

16. The apparatus of claim 14, wherein:
said at least one sensor comprises at least one of a group consisting of an accelerometer, a gyroscope, an imager, a stereo pair of imagers, a GPS sensor, a magnetometer, a structured light sensor, a time-of-flight sensor, an ultrasonic sensor, and a wireless signal triangulation sensor.

17. The apparatus of claim 12, wherein:
said user output comprises a visual display.

18. The apparatus of claim 12, wherein:
said user output comprises a stereo pair of visual displays.

19. The apparatus of claim 12, wherein:
at least a portion of said apparatus is disposed on a head mounted display.

20. The method of claim 12, wherein:
said states for said data entities are incorporated into said data entities.

21. A method comprising:
instantiating on a processor a data entity establisher, said data entity establisher comprising executable instructions adapted for establishing a plurality of distinct data entities, each said distinct data entity comprising at least one of a group consisting of an augmented reality entity and a virtual reality entity;
instantiating on said processor a state establisher, said state establisher comprising executable instructions adapted for establishing a plurality of distinct states for each said data entity, each said state comprising:
a state time;
a plurality of state properties at least substantially corresponding to properties of one said data entity substantially at said state time, said plurality of state properties comprising a state spatial arrangement of said data entity;
instantiating on said processor a storer, said storer comprising executable instructions adapted for storing said plurality of distinct data entities and said distinct states therefor, so as to enable output of said data distinct entities to at least one of an augmented reality environment and a virtual reality environment with each said data entity exhibiting at least a portion of one of said distinct states therefor;
disposing a user output in communication with said processor;
wherein:
   said data entity establisher and said state establisher are adapted to cooperate to establish:
      a first data entity with a first state and a second state, a first state time of said first state being substantially different from a second state time of said second state; and
      said first data entity with said first state, and a second data entity with a third state, said first state time of said first state being substantially different from a third state time of said third state;
   said storer is adapted to store for output at a same output time:
      a first iteration of said first data entity exhibiting said first state and a second iteration of said first data entity exhibiting said second state, said output time being substantially different from said first and second state times; and
      said first iteration of said first data entity exhibiting said first state and a first iteration of said second data entity exhibiting said third state, said output time being substantially different from said first and third state times;
   said user output is adapted to output at said same output time so as to be sensed by a user:
      said first iteration of said first data entity exhibiting said first state and said second iteration of said first data entity exhibiting said second state; and
      said first iteration of said first data entity exhibiting said first state and said first iteration of said second data entity exhibiting said third state.

22. The method of claim 21, wherein:
said data entity establisher is adapted to select at least one of said plurality of data entities, said at least one data entity being in existence prior to a selection thereof.

23. The method of claim 21, wherein:
said data entity establisher is adapted to create at least one of said plurality of data entities.

24. The method of claim 21, wherein:
said data entity establisher is adapted to generate at least one of said plurality of data entities from a parent entity.

25. The method of claim 24, wherein:
said parent entity comprises at least one of a group consisting of a physical object, a physical background, a physical environment, a physical creature, and a physical phenomenon.

26. The method of claim 24, wherein:
said parent entity comprises at least one of a group consisting of an augmented reality object and a virtual reality object.

27. The method of claim 21, comprising:
instantiating on said processor a data entity distinguisher, said data entity distinguisher comprising executable instructions adapted for distinguishing at least one of said plurality of data entities from a surrounding thereof.

28. The method of claim 21, comprising:
instantiating on said processor an identifier, said identifier comprising executable instructions adapted for identifying at least one of a group consisting of at least one of said plurality of data entities, a parent entity for said at least one of said plurality of data entities, and at least one of said state properties therefor.

29. The method of claim 21, comprising:

instantiating on said processor a data entity receiver, said data entity receiver comprising executable instructions adapted for receiving from said data store at least one of said plurality of data entities;

instantiating on said processor a state receiver, said state receiver comprising executable instructions adapted for receiving from said data store at least one said state for said at least one data entity;

instantiating on said processor an outputter, said outputter comprising executable instructions adapted for outputting said plurality of data entities via said user output.

30. The apparatus of claim 21, wherein:

said states for said data entities are incorporated into said data entities.

31. A method comprising:

instantiating on said processor a data entity receiver, said data entity receiver comprising executable instructions adapted for receiving from a data store a plurality of distinct data entities, each said distinct data entity comprising at least one of a group consisting of an augmented reality entity and a virtual reality entity;

instantiating on said processor a state receiver, said state receiver comprising executable instructions adapted for receiving from said data store a plurality of distinct states for each said data entity, each said state comprising:

a state time;

a plurality of state properties at least substantially corresponding to properties of said data entity substantially at said state time, said plurality of state properties comprising a state spatial arrangement of said data entity;

disposing a user output in communication with said processor;

instantiating on said processor an outputter, said outputter comprising executable instructions adapted for outputting said plurality of data entities via said user output to said at least one of said augmented reality environment and said virtual reality environment, with each said data entity exhibiting at least a portion of one of said states therefor so as to be sensed by a user;

wherein:

said data entity receiver and said state receiver are adapted to cooperate to establish:

a first data entity with a first state and a second state, a first state time of said first state being substantially different from a second state time of said second state; and said first data entity with said first state, and a second data entity with a third state, said first state time of said first state being substantially different from a third state time of said third state;

said outputter is adapted to output via said user output at at a same output time:

a first iteration of said first data entity exhibiting at least said portion of said first state, and a second iteration of said first data entity exhibiting at least said portion of said second state, said output time being substantially different from said first and second state times; and said first iteration of said data entity exhibiting at least said portion of said first state and a first iteration of said second data entity exhibiting at least said portion of said third state, said output time being substantially different from said first and third state times.

32. The method of claim 31, comprising:

instantiating on said processor an identifier, said identifier comprising executable instructions adapted for identifying at least one of a group consisting of at least one of said plurality of data entities and at least one of said state properties therefor.

33. The method of claim 31, wherein:

said states for said data entities are incorporated into said data entities.

* * * * *